US012628305B1

(12) United States Patent
Harvey et al.

(10) Patent No.: US 12,628,305 B1
(45) Date of Patent: May 12, 2026

(54) AUTOMATED TERMINAL WIRING MODIFICATION

(71) Applicants: Troy Aaron Harvey, Salt Lake City, UT (US); Jeremy David Fillingim, Salt Lake City, UT (US)

(72) Inventors: Troy Aaron Harvey, Salt Lake City, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 0 days.

(21) Appl. No.: 18/409,681

(22) Filed: Jan. 10, 2024

Related U.S. Application Data

(63) Continuation of application No. 17/216,565, filed on Mar. 29, 2021, now abandoned.

(Continued)

(51) Int. Cl.
*G06F 30/20* (2020.01)
*F24F 11/32* (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC .. H05K 7/1465; H05K 7/1468; H05K 7/1477; H05K 7/1481; F24F 11/32; F24F 11/63; F24F 11/88; F24F 11/49; H04W 4/80; H04W 84/00; G06F 3/04186; G06F 30/18; G06F 30/13; G06F 30/12; G06F 1/3209; G06F 1/3246; G06F 3/0482; G06F 3/04847; G06F 3/147; G06F 8/436; G06F 8/51; G06F 8/53; G06F 8/74;
(Continued)

(56) References Cited

U.S. PATENT DOCUMENTS 4,353,653 A 10/1982 Zimmerman
5,208,765 A 5/1993 Turnbull
(Continued)

FOREIGN PATENT DOCUMENTS

CN 103926912 A 7/2014
CN 206002869 U 3/2017
(Continued)

OTHER PUBLICATIONS

Amin, Massoud, "Toward self-healing energy infrastructure systems," IEEE Computer Applications in Power 14.1 (2002): pp. 20-28.

(Continued)

*Primary Examiner* — Kibrom K Gebresilassie

(57) ABSTRACT

Tools and techniques are described to automate creation of point mapping diagrams between controllers and controlled resources. After receiving a defined space diagram (which may be input using a graphical interface of the controller, or by other means), resource locations and resource wiring requirements (which may be done automatically), a wiring diagram including point mapping between the resources and any necessary controllers is generated. If resources need to be moved, a new wiring diagram and/or point mapping can be regenerated.

20 Claims, 16 Drawing Sheets

Related U.S. Application Data

(60) Provisional application No. 63/070,460, filed on Aug. 26, 2020.

(51) Int. Cl.

| | |
|---|---|
| *F24F 11/49* | (2018.01) |
| *F24F 11/63* | (2018.01) |
| *F24F 11/88* | (2018.01) |
| *G01R 31/55* | (2020.01) |
| *G05B 13/02* | (2006.01) |
| *G05B 15/02* | (2006.01) |
| *G05B 19/048* | (2006.01) |
| *G05B 23/02* | (2006.01) |
| *G06F 1/3209* | (2019.01) |
| *G06F 1/3246* | (2019.01) |
| *G06F 3/041* | (2006.01) |
| *G06F 3/0482* | (2013.01) |
| *G06F 3/04847* | (2022.01) |
| *G06F 3/147* | (2006.01) |
| *G06F 8/41* | (2018.01) |
| *G06F 8/51* | (2018.01) |
| *G06F 8/53* | (2018.01) |
| *G06F 8/74* | (2018.01) |
| *G06F 9/4401* | (2018.01) |
| *G06F 30/12* | (2020.01) |
| *G06F 30/13* | (2020.01) |
| *G06F 30/18* | (2020.01) |
| *G06Q 30/0283* | (2023.01) |
| *H02J 3/00* | (2006.01) |
| *H04B 3/46* | (2015.01) |
| *H04L 43/50* | (2022.01) |
| *H04L 67/12* | (2022.01) |
| *H04L 67/125* | (2022.01) |
| *H04L 67/75* | (2022.01) |
| *H04M 3/30* | (2006.01) |
| *H04W 4/80* | (2018.01) |
| *H04W 84/00* | (2009.01) |
| *H05K 7/14* | (2006.01) |
| *G06F 30/392* | (2020.01) |
| *G06F 111/04* | (2020.01) |
| *G06F 111/16* | (2020.01) |
| *G06F 113/04* | (2020.01) |
| *G06F 113/16* | (2020.01) |
| *G06F 115/12* | (2020.01) |

(52) U.S. Cl.
CPC .............. *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/04186* (2019.05); *G06F 3/0482* (2013.01); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
CPC .. G06F 9/4418; G06F 30/392; G06F 2113/04; G06F 2111/04; G06F 2111/16; G06F 2113/16; G06F 2115/12; G01R 31/55; H04L 67/75; H04L 43/50; H04L 67/12; H04L 67/125; G05B 13/0265; G05B 15/02; G05B 19/048; G05B 23/0216; G05B 23/0264; G05B 23/0272; G06Q 30/0283; H02J 3/00; H02J 2310/12; H04B 3/46
See application file for complete search history.

(56) References Cited

U.S. PATENT DOCUMENTS

| | | | |
|---|---|---|---|
| 5,530,643 | A | 6/1996 | Hodorowski |
| 5,835,458 | A | 11/1998 | Bischel et al. |
| 6,275,962 | B1 | 8/2001 | Fuller et al. |
| 6,301,341 | B1 | 10/2001 | Gizara et al. |
| 6,349,235 | B1 | 2/2002 | Gibart et al. |
| 6,437,692 | B1 | 8/2002 | Petite et al. |
| 6,606,731 | B1 | 8/2003 | Baum et al. |
| 6,645,066 | B2 | 11/2003 | Gutta et al. |
| 6,813,777 | B1 | 11/2004 | Weinberger et al. |
| 6,891,838 | B1 | 5/2005 | Petite et al. |
| 7,102,502 | B2 | 9/2006 | Autret |
| 7,248,603 | B1 | 7/2007 | Grunkemeyer et al. |
| 7,304,855 | B1 | 12/2007 | Milligan et al. |
| 7,578,135 | B2 | 8/2009 | Mattheis |
| 7,587,250 | B2 | 9/2009 | Coogan et al. |
| 7,729,882 | B2 | 6/2010 | Seem |
| 7,734,572 | B2 | 6/2010 | Wiemeyer et al. |
| 7,835,431 | B2 | 11/2010 | Belge |
| 7,865,629 | B1 | 1/2011 | Tantos et al. |
| 7,917,232 | B2 | 3/2011 | McCoy et al. |
| 8,024,054 | B2 | 9/2011 | Mairs et al. |
| 8,099,178 | B2 | 1/2012 | Mairs et al. |
| 8,503,183 | B2 | 8/2013 | Hamilton et al. |
| 8,503,943 | B2 | 8/2013 | Spanhake |
| 8,628,239 | B2 | 1/2014 | Merrow et al. |
| 8,643,476 | B2 | 2/2014 | Pinn et al. |
| 8,749,959 | B2 | 6/2014 | Riley et al. |
| 8,782,619 | B2 | 7/2014 | Wu et al. |
| 8,925,358 | B2 | 1/2015 | Kasper |
| 9,441,847 | B2 | 9/2016 | Grohman |
| 9,521,724 | B1 | 12/2016 | Berry et al. |
| 9,544,209 | B2 | 1/2017 | Gielarowski et al. |
| 9,602,301 | B2 | 3/2017 | Averitt |
| 9,664,400 | B2 | 5/2017 | Wroblewski et al. |
| 9,678,494 | B2 | 6/2017 | Hyde et al. |
| 9,740,385 | B2 | 8/2017 | Fadell et al. |
| 9,791,872 | B2 | 10/2017 | Wang et al. |
| 9,857,238 | B2 | 1/2018 | Malhotra et al. |
| 9,860,961 | B2 | 1/2018 | Chemel et al. |
| 9,952,573 | B2 | 4/2018 | Sloo et al. |
| 10,042,730 | B2 | 8/2018 | Zebian |
| 10,094,586 | B2 | 10/2018 | Pavlovski et al. |
| 10,223,721 | B1 | 3/2019 | Bhatia |
| 10,334,758 | B1 | 6/2019 | Ramirez et al. |
| 10,512,143 | B1 | 12/2019 | Ikehara et al. |
| 10,528,016 | B2 | 1/2020 | Noboa |
| 10,557,889 | B2 | 2/2020 | Montoya et al. |
| 10,558,183 | B2 | 2/2020 | Piaskowski et al. |
| 10,558,248 | B2 | 2/2020 | Adrian |
| 10,627,124 | B2 | 4/2020 | Walser et al. |
| 10,640,211 | B2 | 5/2020 | Whitten et al. |
| 10,672,293 | B2 | 6/2020 | Labutov et al. |
| 10,687,435 | B2 | 6/2020 | Adrian et al. |
| 10,736,228 | B2 | 8/2020 | Kho et al. |

(56) References Cited

U.S. PATENT DOCUMENTS

| | | | |
|---|---|---|---|
| 10,892,946 | B2 | 1/2021 | Costa et al. |
| 10,900,489 | B2 | 1/2021 | Rendusara et al. |
| 10,942,871 | B2 | 3/2021 | Cawse et al. |
| 10,943,444 | B2 | 3/2021 | Boyd et al. |
| 10,966,068 | B2 | 3/2021 | Tramiel et al. |
| 10,966,342 | B2 | 3/2021 | Lairsey et al. |
| 10,969,133 | B2 | 4/2021 | Harvey |
| 11,088,989 | B2 | 8/2021 | Gao et al. |
| 11,229,138 | B1 | 1/2022 | Harvey et al. |
| 11,294,254 | B2 | 4/2022 | Patterson et al. |
| 11,598,862 | B2 | 3/2023 | Henderson et al. |
| 2004/0236547 | A1 | 11/2004 | Rappaport et al. |
| 2005/0040247 | A1 | 2/2005 | Pouchak |
| 2007/0096902 | A1 | 5/2007 | Seeley et al. |
| 2007/0162288 | A1 | 7/2007 | Springhart et al. |
| 2008/0222584 | A1 | 9/2008 | Habib et al. |
| 2008/0270951 | A1 | 10/2008 | Anand et al. |
| 2008/0277486 | A1 | 11/2008 | Seem et al. |
| 2009/0189764 | A1 | 7/2009 | Keller et al. |
| 2010/0005218 | A1 | 1/2010 | Gower et al. |
| 2010/0025483 | A1 | 2/2010 | Hoeynck et al. |
| 2010/0131933 | A1 | 5/2010 | Kim et al. |
| 2010/0162037 | A1 | 6/2010 | Maule et al. |
| 2010/0237891 | A1 | 9/2010 | Lin et al. |
| 2011/0087988 | A1 | 4/2011 | Ray et al. |
| 2011/0125930 | A1 | 5/2011 | Tantos et al. |
| 2012/0102472 | A1 | 4/2012 | Wu et al. |
| 2012/0221986 | A1 | 8/2012 | Whitford et al. |
| 2013/0343207 | A1 | 12/2013 | Cook et al. |
| 2013/0343388 | A1 | 12/2013 | Stroud et al. |
| 2013/0343389 | A1 | 12/2013 | Stroud et al. |
| 2013/0343390 | A1 | 12/2013 | Moriarty et al. |
| 2013/0346987 | A1 | 12/2013 | Raney et al. |
| 2014/0088772 | A1 | 3/2014 | Lelkens |
| 2014/0101082 | A1 | 4/2014 | Matsuoka et al. |
| 2014/0215446 | A1 | 7/2014 | Araya et al. |
| 2014/0215450 | A1 | 7/2014 | Salisbury et al. |
| 2014/0277757 | A1 | 9/2014 | Wang et al. |
| 2014/0280960 | A1 | 9/2014 | Paramasivam et al. |
| 2014/0304542 | A1 | 10/2014 | Rogers et al. |
| 2014/0358291 | A1 | 12/2014 | Wells |
| 2014/0364985 | A1 | 12/2014 | Tiwari et al. |
| 2015/0081928 | A1 | 3/2015 | Wintzell et al. |
| 2015/0198938 | A1 | 7/2015 | Steele et al. |
| 2015/0234381 | A1 | 8/2015 | Ratilla et al. |
| 2016/0016454 | A1 | 1/2016 | Yang et al. |
| 2016/0062753 | A1 | 3/2016 | Champagne |
| 2016/0073521 | A1 | 3/2016 | Marcade et al. |
| 2016/0086242 | A1 | 3/2016 | Schafer et al. |
| 2016/0088438 | A1 | 3/2016 | O'Keeffe |
| 2016/0092427 | A1 | 3/2016 | Bittmann |
| 2016/0132308 | A1 | 5/2016 | Muldoon |
| 2016/0195856 | A1 | 7/2016 | Spero |
| 2016/0205784 | A1 | 7/2016 | Kyle et al. |
| 2016/0209868 | A1 | 7/2016 | Hartman |
| 2016/0285715 | A1 | 9/2016 | Gielarowski et al. |
| 2016/0295663 | A1 | 10/2016 | Hyde et al. |
| 2017/0075323 | A1 | 3/2017 | Shrivastava et al. |
| 2017/0097259 | A1 | 4/2017 | Brown et al. |
| 2017/0131611 | A1 | 5/2017 | Brown et al. |
| 2017/0149638 | A1 | 5/2017 | Gielarowski et al. |
| 2017/0169075 | A1 | 6/2017 | Jiang et al. |
| 2017/0176034 | A1 | 6/2017 | Hussain et al. |
| 2017/0322579 | A1 | 11/2017 | Goparaju et al. |
| 2017/0365908 | A1 | 12/2017 | Hughes et al. |
| 2018/0005195 | A1 | 1/2018 | Jacobson |
| 2018/0075168 | A1 | 3/2018 | Tiwari et al. |
| 2018/0089172 | A1 | 3/2018 | Needham |
| 2018/0123272 | A1 | 5/2018 | Mundt et al. |
| 2018/0202678 | A1 | 7/2018 | Ahuja et al. |
| 2018/0262573 | A1 | 9/2018 | Przybylski et al. |
| 2018/0266716 | A1 | 9/2018 | Bender et al. |
| 2018/0307781 | A1 | 10/2018 | Byers et al. |
| 2019/0087076 | A1 | 3/2019 | Dey et al. |
| 2019/0138704 | A1 | 5/2019 | Shrivastava et al. |
| 2019/0146429 | A1 | 5/2019 | Nayak et al. |
| 2019/0156443 | A1 | 5/2019 | Hall |
| 2019/0173109 | A1 | 6/2019 | Wang |
| 2019/0278442 | A1* | 9/2019 | Liang ..................... G08B 21/18 |
| 2020/0003444 | A1 | 1/2020 | Yuan et al. |
| 2020/0018506 | A1 | 1/2020 | Ruiz et al. |
| 2020/0050161 | A1 | 2/2020 | Noboa |
| 2020/0133257 | A1 | 4/2020 | Cella et al. |
| 2020/0142365 | A1 | 5/2020 | Sharma et al. |
| 2020/0150508 | A1 | 5/2020 | Patterson et al. |
| 2020/0167442 | A1 | 5/2020 | Roecker et al. |
| 2020/0187147 | A1 | 6/2020 | Meerbeek et al. |
| 2020/0221269 | A1 | 7/2020 | Tramiel et al. |
| 2020/0226223 | A1 | 7/2020 | Reichl |
| 2020/0228759 | A1 | 7/2020 | Ryan et al. |
| 2020/0255142 | A1 | 8/2020 | Whitten et al. |
| 2020/0279482 | A1 | 9/2020 | Berry et al. |
| 2020/0287786 | A1 | 9/2020 | Anderson et al. |
| 2020/0288558 | A1 | 9/2020 | Anderson et al. |
| 2020/0342526 | A1 | 10/2020 | Ablanczy |
| 2020/0348038 | A1 | 11/2020 | Risbeck et al. |
| 2020/0348662 | A1 | 11/2020 | Cella et al. |
| 2020/0379730 | A1 | 12/2020 | Graham et al. |
| 2020/0387041 | A1 | 12/2020 | Shrivastava et al. |
| 2020/0387129 | A1 | 12/2020 | Chandaria |
| 2021/0073441 | A1 | 3/2021 | Austern et al. |
| 2021/0081504 | A1 | 3/2021 | Mccormick et al. |
| 2021/0081880 | A1 | 3/2021 | Bivins et al. |
| 2021/0157312 | A1 | 5/2021 | Cella et al. |
| 2021/0182660 | A1 | 6/2021 | Amirguliyev et al. |
| 2021/0366793 | A1 | 11/2021 | Hung et al. |
| 2021/0383041 | A1 | 12/2021 | Harvey et al. |
| 2021/0400787 | A1 | 12/2021 | Abbo et al. |
| 2022/0066722 | A1 | 3/2022 | Harvey et al. |
| 2022/0069863 | A1 | 3/2022 | Harvey |
| 2022/0070293 | A1 | 3/2022 | Harvey et al. |

FOREIGN PATENT DOCUMENTS

| | | |
|---|---|---|
| CN | 206489622 U | 9/2017 |
| JP | 6301341 B2 | 3/2018 |
| TW | 200420980 A | 10/2004 |
| WO | 2008016500 A3 | 3/2008 |
| WO | 2012019328 A1 | 2/2012 |
| WO | 2014025511 A1 | 2/2014 |

OTHER PUBLICATIONS

BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

De Meester et al., SERIF:A Semantic Exercise Interchange FormatConference: Proceedings of the 1st International Workshop on LINKed EDucation, Oct. 2015.

Gou, Wendy et al., "Wireless mesh networks in intelligent building automation control: a survey." International Journal of Intelligent Control and Systems, vol. 16, No. 1, Mar. 2011, 28-36.

Gou, Wenqi, and Mengchu Zhou, "An emerging technology for improved building automation control," 2009, IEEE International Conference on Systems, Man and Cybernetics, IEEE, 2009, pp. 337-342.

Gungor et al., "Industrial Wireless Sensor Networks: Challenges, Design Principles, and Technical Approaches," IEEE Transactions on Industrial Electronics, vol. 56, No. 10, Oct. 2009.

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

Kalagnanam et al., "A System For Automated Mapping of Bill-of_Materials Part Numbers", KDD '04: Proceedings of the tenth ACM SIGKDD international conference on Knowledge discovery and data mining, Aug. 2004, pp. 805-810.

Kastner, Wolfgang, et al., "Building Automation System Integration into the Internet of Things, The IoT6 Approach, Its Realization and

(56) References Cited

OTHER PUBLICATIONS

Validation," Proceedings of the 2014 IEEE Emerging Technology and Factory Automation (ETFA), IEEE, 2014, pp. 1-9 (Year:2014).

Khan et al., Energy management in Wireless Sensor Networks: A survey. Computers and Electrical Engineering, Elsevier, 2014, vol. 41, Jan. 2015, p. 159-176.

Ouf et al., Effectiveness of using WiFi technologies to detect and predict building occupancy, Sust. Buildi. 2, 7 (2017).

Serale, G., et al., "Model Predictive Control (MPC) for Enhancing Building and HVAC System Energy Efficiency: Problem Formulation, Applications and Opportunities," Energies 2018, 11, 631; doi: 10.3390, Mar. 12, 2018.

Shailendra, Eshan et al., "Analyzing home automation and networking technologies," IEEE Potentials 37.1 (2018): pp. 27-33, (Year: 2018).

Siano, P, "Demand response and smart grids—A survey," Renewable and Sustainable Energy Reviews vol. 30, Feb. 2014, pp. 461-478.

U.S. Appl. No. 15/995,019 Office Action mailed Jul. 26, 2019.

U.S. Appl. No. 15/995,019 Office Action mailed Oct. 8, 2020.

U.S. Appl. No. 15/995,019 Office Action mailed Apr. 15, 2020.

Wang et al., "A Practical Multi-Sensor Cooling Demand Estimation Approach Based on Visual Indoor and Outdoor Information Sensing," Sensors 2018, 18, 3591; doi: 10.3390.

Yegulap, Serdar, "What is LLVM? The power behind Swift, Rust, Clang, and more," Infoworld, Mar. 11, 2020.

* cited by examiner

300

Accept Defined Space Representation
305

Accept A Unit Model 310

Accept A Constraint 315

Calculate Placement 320

Determine Wiring Route 325

Determine Point Mapping 330

1000

1500

1600

1700

AUTOMATED TERMINAL WIRING MODIFICATION

RELATED APPLICATION

The present application is a continuation of U.S. patent application Ser. No. 17/216,565, filed on Mar. 29, 2021, which claims priority to U.S. Provisional Patent Application Ser. No. 63/070,460 filed Aug. 26, 2020, the entire disclosures of which are hereby incorporated by reference for all purposes.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to generating point maps, and more particularly to automatically generating point maps by creating a digital version of resources that are to be point mapped, and a digital version of the space that the resources will be in, which allows near-automatic creation of point maps.

BACKGROUND

Wiring diagrams take hours to create. Further, if a problem comes up when building a structure that requires that a wired device must be moved, the wiring diagram must be recreated from scratch, which can entail quite a bit of effort. Almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or to govern the interconnections between components and sub-system synergistics. Digital model based approaches to date have been limited in scope and specific to known models defined a-priori. They have thus lacked the ability to enable users to create complex systems of interconnected building zones by ad hoc means, use simple graphical user interfaces to define a system, or enable a digital system model to automate creation and easy updating of wiring diagrams.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, one innovative embodiment comprises accepting a building representation into a controller, the controller comprising a processor, memory, and a user interface; accepting a unit model from a list of predefined models displayed on the user interface, the unit model having wiring requirements and location within the building representation; accepting a constraint; calculating placement of the controller within the building representation based at least partially on the constraint; determining a wiring route between the controller and the unit model based at least in part on the building representation; and determining point mapping between the controller and the unit model based in part on the wiring requirements.

Some embodiments display the point mapping on the user interface. Some embodiments allow a user to move a unit model to a new location on a digital display, which can rebuild the wiring route or the point mapping.

Some embodiments comprise a wiring module with a terminal wiring requirement. After a wiring diagram has be generated, a user can modify the wiring module; and the controller is able to determine if the modification is legal for the controller. If so, the controller can regenerate a new wiring diagram. Some embodiments allow the controller to modify wiring pins to match device wiring requirements.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
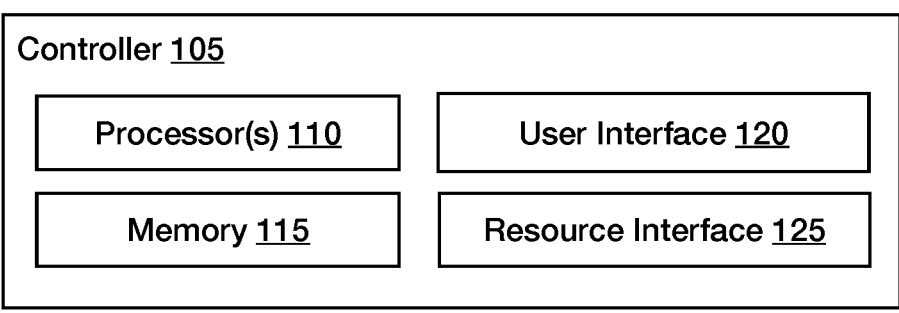
FIG. 1 is a functional block diagram showing an exemplary embodiment of a controller in conjunction which some described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to point mapping interfaces. In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "One embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

I. Overview

In some embodiments, a user inputs a defined space layout into a controller system. This layout may be input in a variety of ways, without limitation, by inputting blueprints, by scanning an existing defined space using a 3-D scanning device, etc. In some implementations, once a defined space is input, equipment and sensors are placed within the defined space representation within the control system, then the system designs itself. The system determines where the controllers are, and develops a point map showing how the wires in the sensors, equipment, and other resources will connect to the controllers. In some embodiments, the system also provides a guided wiring diagram for the electrical wiring in the defined space, such that the diagram can be used to wire the sensors, equipment, and other resources.

Once the wiring diagram has been created, a user can change the location of one or more resources within the controller, and the system will automatically generate a new wiring diagram and make other necessary changes. In some embodiments the system uses the wiring diagram to determine the controller topology and develop a wiring diagram. The system also gives (near) universal protocol translation, in that different protocols are understood and, in some instances, translated into a common protocol used by a controller that can re-translate back to the protocol understood by a given resource. In some embodiments, the system determines how many of each kind of I/O module is needed to fill in the controller topology—for example, a controller may have room for 8 modules, while a satellite controller may have room for two modules. This entails determining how many pins and of what type each I/O the different module types have. These are then mapped to the resources. In other implementations, the resources are checked to determine what their wiring needs are; these specific wiring needs are matched to modules. In some embodiments, the controller does not have modules; the resources are mapped directly to the controllers.

In some implementations, locations of the resources and their wiring requirements are already know through the model input into the controller. So, wiring paths between a specific resource and a location that a controller or a satellite controller is in can be determined; details of how it is to be wired to the controller are also known.

Constraints can be added to the system that creates the wiring diagram and point mapping. Common constraint inputs are minimizing labor, minimizing hardware, maximizing labor, maximizing hardware, and/or specifying fill rate of hardware.

Figure 10:
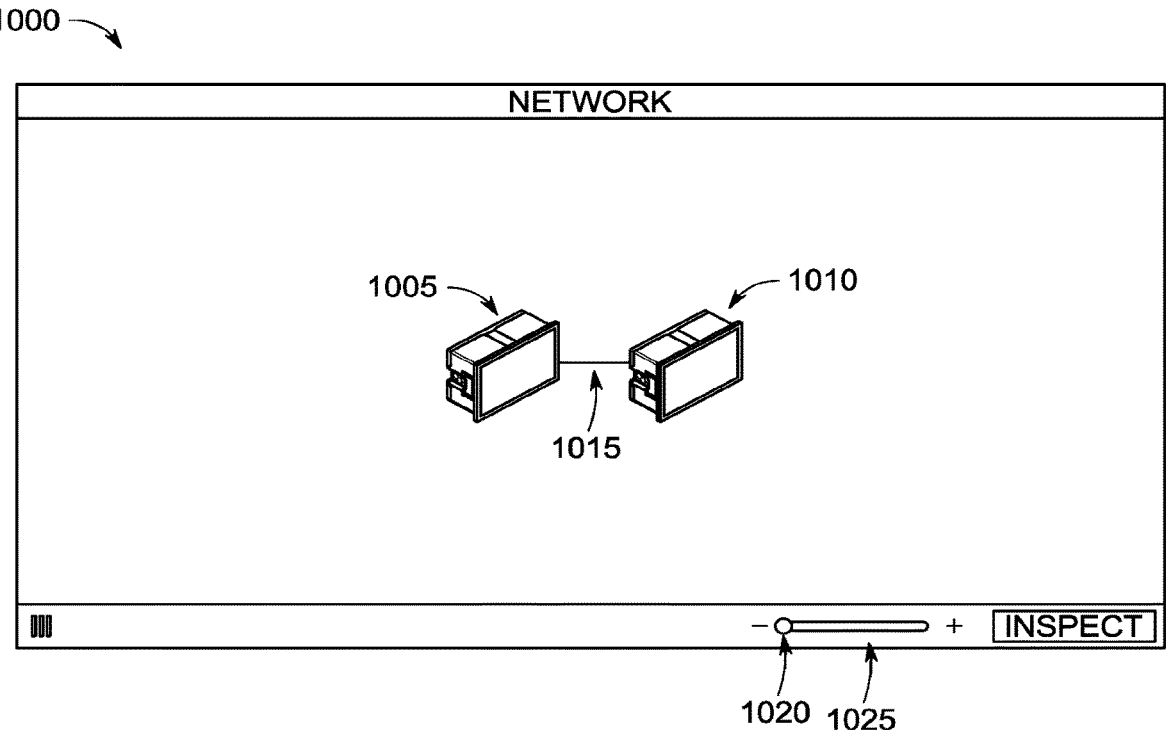
FIG. 10 is an exemplary network controller wiring diagram in conjunction with which described embodiments can be implemented.

Some constraints can be thought of as decreasing one possible constraint which, by nature, increases another. Examples include equipment cost vs. labor cost, and controller fill rate vs. controller cost. When higher labor cost is chosen, the number of controllers is minimized. This increases the average length from the controller any given piece of equipment is, requiring more labor to install. Then, it can be determined how to group resources and modules and controllers to make installation (how much wire must be used? How much labor will installation take?) as efficient as possible by doing resource analysis (what are the resources), location analysis (where are the resources), I/O analysis (how many terminals are available, what can the terminals do), and constraint analysis (fewer/more controllers, lower/higher labor cost). Such a controller hierarchy grouping is shown in FIG. 10. Such computer-determined groupings can be viewed on a user interface, such as the one on a controller that this system might have been built on. The user is not required to use the controller created hierarchy, but, in some embodiments, can modify it, either by using the user interface or can modify in a different way.

Once the mapping between the equipment and the controllers is determined, then the system (which might be the computer hardware and software associated with the controller or set of controllers used to design the defined space) can create the point mapping wiring diagram and/or the full defined space wiring diagram.

Once the wiring diagram is created, it is not set in stone. Because the system understands what and where each resource is, and exactly how it is wired, changes can be easily be made on the user interface, which will then generate a new wiring diagram, changing only the parts that have been modified. For example, if a problem arises during construction that requires placing a piece of equipment in a new location, that change can be made to the digital twin— the computer representation—using a controller interface. The system will then generate the new wiring diagram, including the new pin diagram if the piece of equipment needs to be moved to a different controller.

As the controllers understand the nature of the objects/ resources/equipment that are wired to them, they know what the inputs and outputs for each terminal should be. Each terminal (in some embodiments) have a built in multimeter to ensure the wires are installed correctly in real time. During the controller's self-commissioning sequence, in some embodiments, modules in the controller, the terminals themselves, and/or the controller (satellite controller etc.), test wires for short circuits, cut wires, and proper sensor and equipment connection. In other systems, only some wires are checked.

The technical character of embodiments described herein will be apparent to one of ordinary skill in the art, and will also be apparent in several ways to a wide range of attentive readers. Some embodiments address technical activities that are rooted in computing technology, such as more efficiently generating point mapping diagrams. This, in turn, makes constructing buildings and similar structures much easier, as resources and sensors can be moved during the construction process without requiring days or weeks of effort to recreate a point mapping diagram. Buildings can also be constructed more efficiently as benefits that are not apparent until the construction process can be implemented with little downtime, as wiring diagrams and point mapping diagrams can easily be recreated. Other advantages based on the technical characteristics of the teachings will also be apparent to one of skill from the description provided.

II. Exemplary Method for Automatically Creating Point Maps

With reference to FIG. 1, a system is shown that may be used, in whole, or in part, in any of the embodiments disclosed herein. A controller 105 is disclosed, which may be part of a defined space control system that controls aspects of a space. The space may be a building, a portion of a building, a zone within a building, a room in a building, a floor of a building, a collection of buildings, a collection of buildings and the grounds around them, a portion of a number of buildings, and so forth. The controller may comprise a single controller housed in a single controller box, may be multiple controllers that work together, such as, for example, using distributed systems methods, and so on. Some controllers may be satellite controllers that comprise a limited set of functions of a controller 105. The controller 105 comprises a processor 110, and a memory 115. This processor and memory may house and run computer programs that may be used in the embodiments disclosed herein.

The controller may also comprise a user interface 120 that allows users to enter information into the controller, and allows the controller to output information. The user interface may be, without limitation, a touchscreen associated with the controller, may be a slidable screen that opens to disclose the controller wiring, may be a screen attached to a computer associated with the controller, etc. The controller may also have a wired interface, a wireless interface, or both. The controller may also have a resource interface 125 which allows the controller to communicate with and/or control resources. This resource interface may be one or more wiring terminals which a resource may directly attach to. Once attached, the controller may be able to communicate with the resource. The controller 105, in some embodiments through its resource interface 125 may also be able to detect errors, and/or read errors that the resource is indicating. For example, an air conditioner may be wired to a controller. The controller can then turn the air conditioner on and off, and, if applicable, turn the air conditioner to an intermediate setting, determine if the air conditioner has ceased to send inputs, is sending incorrect inputs, is sending error messages, etc.

Figure 2:
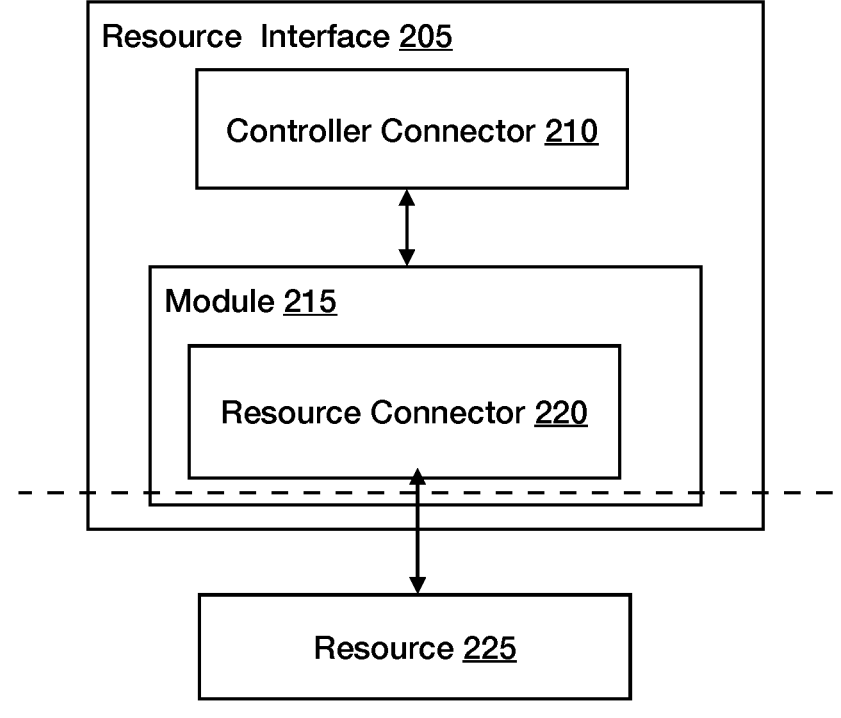
FIG. 2 is an exemplary block diagram of a resource interface in conjunction with which some described embodiments can be implemented.

FIG. 2 describes the resource interface 135, 205, used in some implementations, in more detail. In some embodiments, a resource interface 135 may comprise a controller 105 attached through a controller connector 210 to a module 215. The module may have a resource connector 220 which is attached to a resource 225. The controller resource interface 205 is therefore connected to the resource 225 through the module 215. The controller connector 210 and the resource connector can be any sort of wiring terminal that attaches a resource or an intermediary (such as a module) to a controller, as known to those of skill in the art. For example, and without limitation, a resource may be physically wired to a wiring terminal, there may be connected by cable connectors (e.g., twisted-pair connectors, coaxial cable connectors, or fiber-optic connectors), USB connectors, pin connectors, and so on.

The resource may correspond to a resource that may be wired to the controller, such as a piece of HVAC equipment, a sensor, a security resource, a sound/entertainment system, etc, or any other resource that has the ability to be connected to the controller 105. A resource will have a specific protocol, such as the signaling system they expect from the controller, the current and voltage that they use and report back, etc. One or more of these protocols can comprise the resource terminal interface attribute 115.

Figure 3:
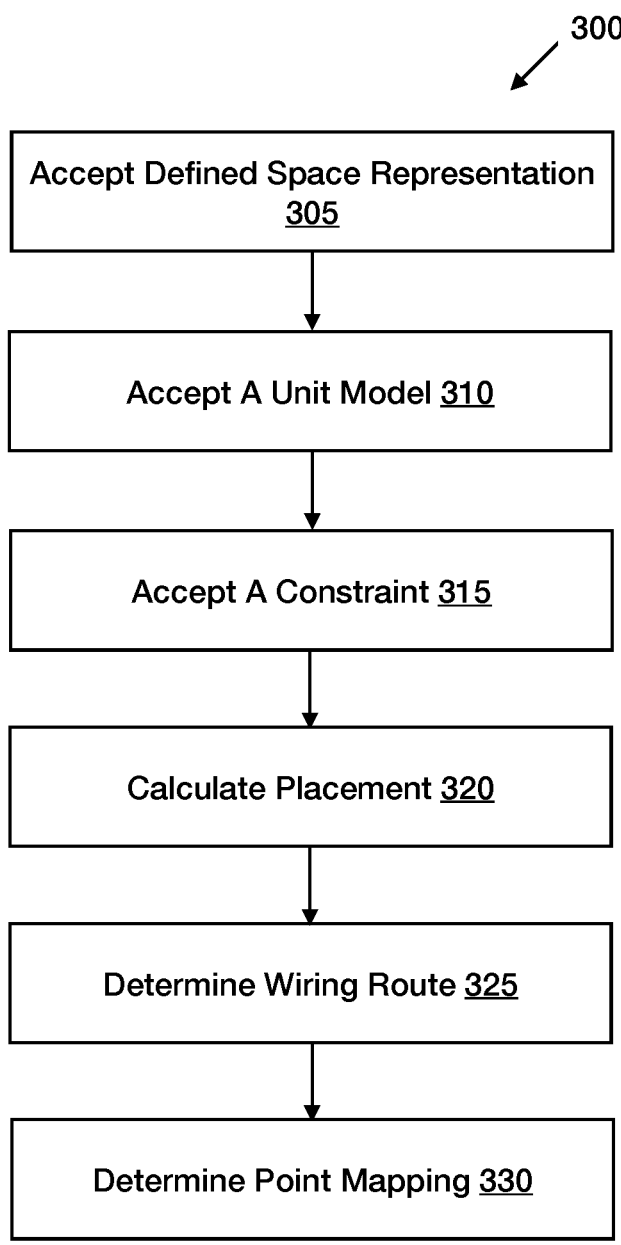
FIG. 3 is an exemplary flow chart illustrating steps in some methods of automated point mapping generation with which some described embodiments may be implemented.

FIG. 3 illustrates some method embodiments in a flowchart 300. Technical methods shown in the figure or otherwise disclosed may be performed in some embodiments automatically, e.g., by a requiring little or no contemporaneous live user input. In a given embodiment zero or more illustrated steps of a method may be repeated, perhaps with different values, sensors, controllers, or resources to operate on. Steps in an embodiment may also be done in a different order than the top-to-bottom order that is laid out in FIG. 3.

In a given embodiment zero or more illustrated steps of a method may be repeated, perhaps with different values, sensors, controllers, or resources to operate on. Steps may be performed in a partially overlapping manner, or fully in parallel, serially. The order in which flowchart 300 is traversed to indicate the steps performed may vary from one performance of the method to another performance of the method. The flowchart traversal order may also vary from one method embodiment to method embodiment. Steps may also be omitted, combined, renamed, regrouped, or otherwise depart from the illustrated flows, provided that the method performed conforms to at least one claim.

At operation 305, a defined space representation is accepted into a controller 105. This defined space representation may be accepted by a user using software stored in memory 115 and the user interface 120; accepting may comprise a variety of methods to input the defined space representation. These may include inputting a blueprint of the space that the controller can read, the space may be scanned using a 3-d scanner; the space may be input using the user interface 120 of the controller 105, a defined space representation may be created using a collection of different methods, and so on, as understood by those of skill in the art.

At operation 310, a unit model is accepted. A unit model is a resource or a sensor or other piece of equipment that can be controlled. Possible unit models, without restriction, are lighting, ventilation, hydronics, such as pumps; heat sources, cooling sources, solar thermal sources, such as solar panels; heat pumps, heat storage, heat exchanges, renewables, VAV components, air components, vents, and sensors. This unit model may be selected from a list of predefined unit models displayed on a user interface on the controller.

Figure 4:
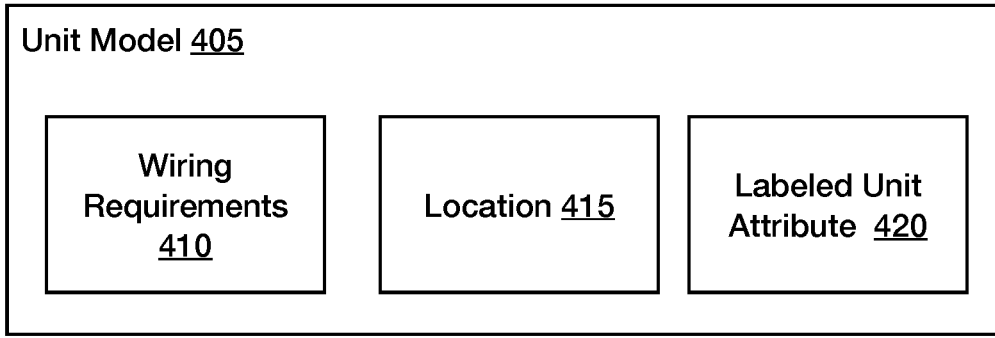
FIG. 4 is an exemplary block diagram of a unit model which some described embodiments can be implemented.

With reference to FIG. 4, a unit model 405 may have wiring requirements 410 and a location 415 within a defined space representation. The wiring requirements are the protocols used for its wiring; the number of wires the unit model requires, the specific codes issued by the unit model for various situations, the current and voltage accepted received at various times, etc. In embodiments, the unit model 405 may have a labeled unit attribute 420, which may be a name that the unit model may be stored under (or through the name, a key can be determined that will allow access into a database that holds information about the unit model 405). The labeled unit attribute, in some embodiments, can be displayed on a user interface 120 associated with the controller 105.

Figure 5:
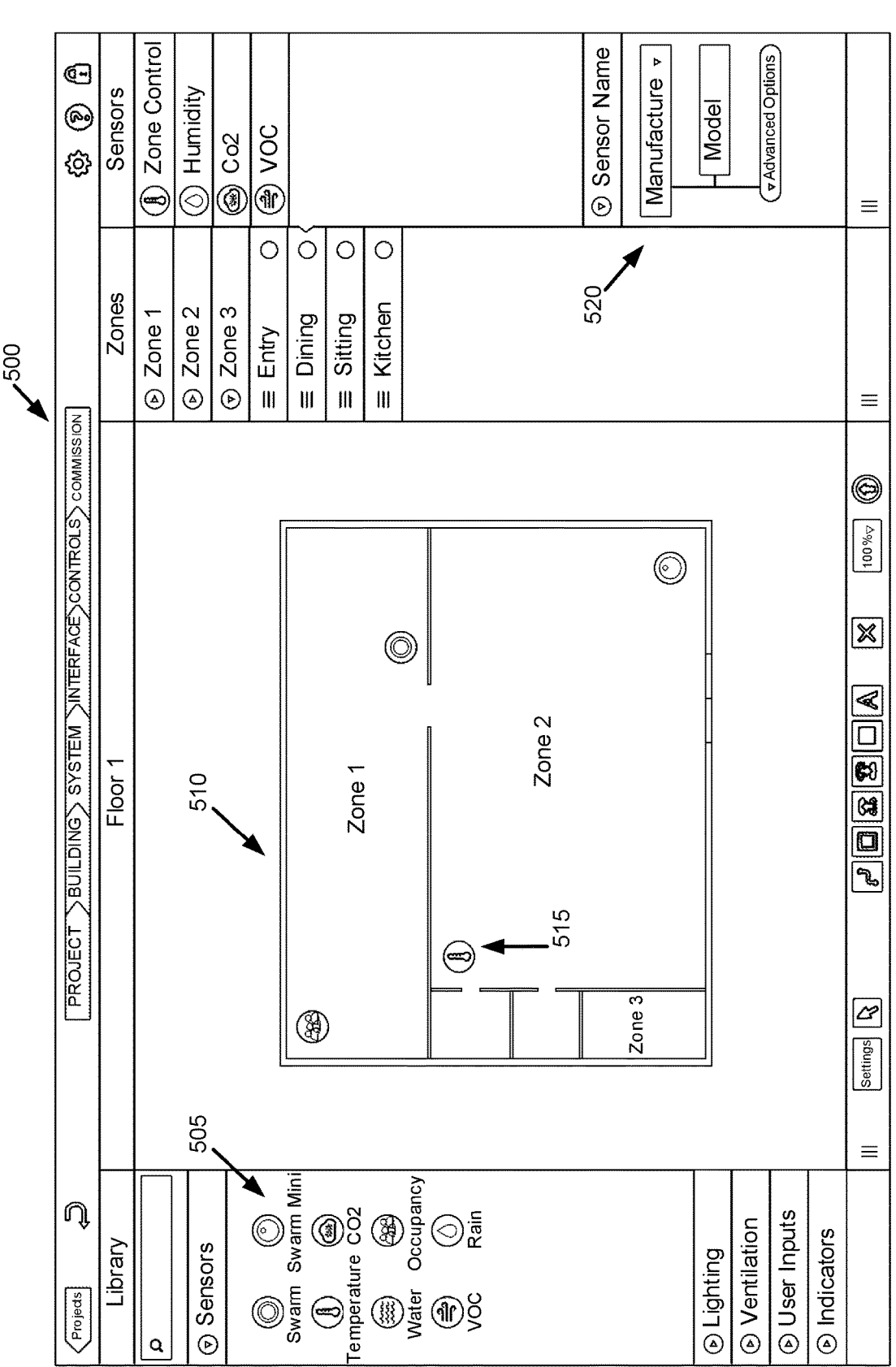
FIG. 5 is an exemplary diagram showing how, in some embodiments, location can be determined.

With reference to FIG. 5, an exemplary screen display 500 is shown that allows a user to select a predefined unit model resource, in this exemplary instance, a sensor. At 505, a list of predefined sensors are displayed. A user can choose a sensor and then drag or otherwise place it in a specific location 515 within a building representation 510. In another embodiment, a user may input a new unit model using software and I/O associated with the controller, such as with an interface 520, which allows a user to input, e.g., a manufacturer, a model, and other information which may comprise specific information about how the unit model behaves. After inputting the new unit model, the unit model may be added to the list of predefined models. In some implementations, the user may select a user-defined unit model directly.

Figure 6:
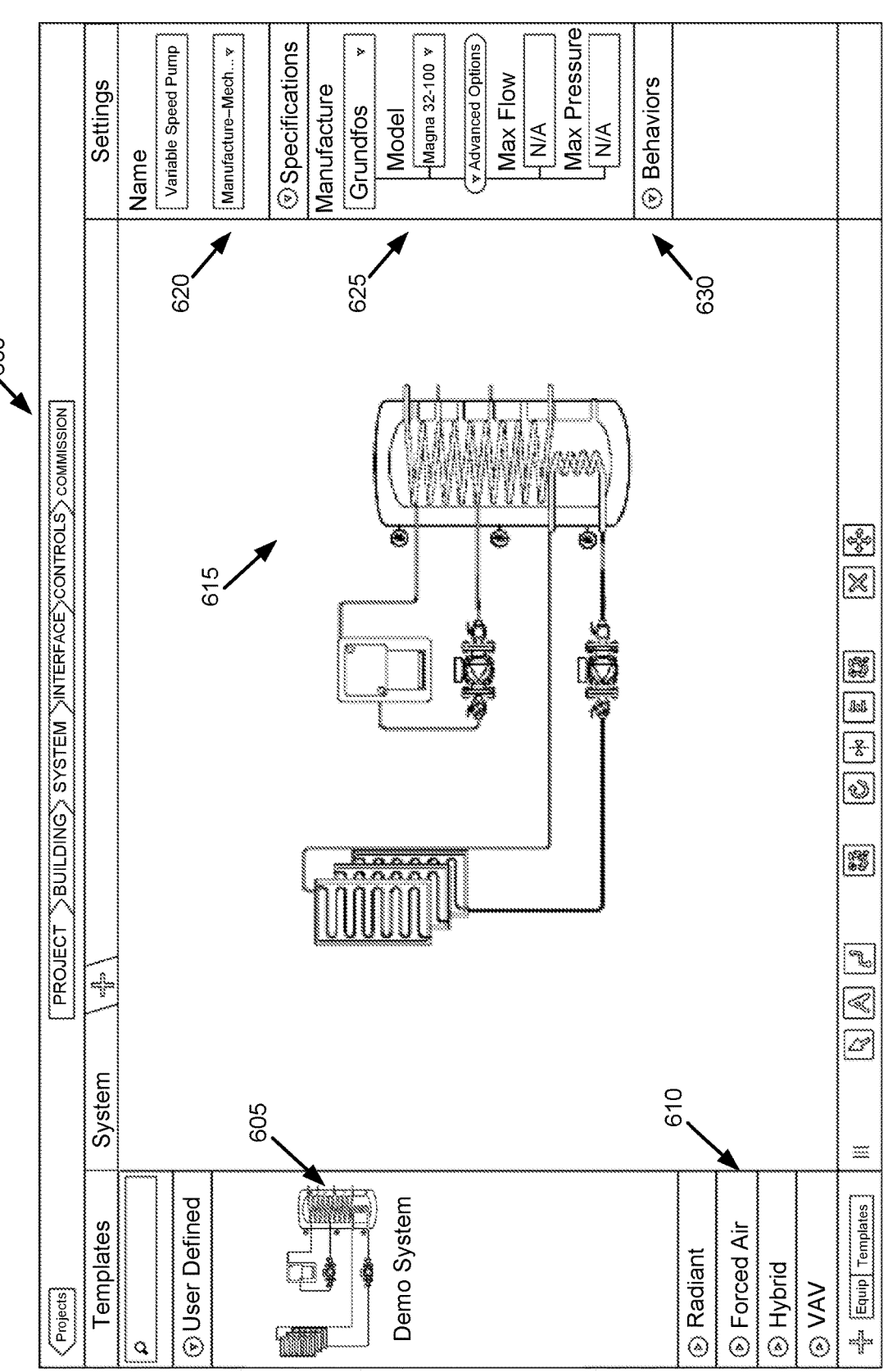
FIG. 6 is an exemplary diagram how, in some embodiments, unit model aspects can be determined.

With reference to FIG. 6, an exemplary screen is shown that allows selection of resource units models, e.g., hydronics, such as pumps; heat sources, cooling sources, solar thermal sources, such as solar panels; heat pumps, heat storage, heat exchanges, renewables, VAV components, and air components. Specifically, in this exemplary implementation, heat sources, e.g., and without limitation, "radiant" (heat), forced air, hybrid, and VAV can be selected at 605. In some implementations, selection involves selecting a resource and then dragging the selected resource into a system pane 615. The selections of specific resources may be included in drawers 610, that when opened up display resource unit models that are already defined. A user can input information about the specific resource, such as a manufacturer at 620. A database associated with the user input system may have information about the manufacturer, in which case, known information may be associated with the resource. In some embodiments, specific information about the unit model (e.g., resource) may be entered at 625. In some embodiments, specific behaviors about the unit model may be entered by the user at, e.g., 630.

Once the selected resource has been moved into a specific location on the user interface representing a location within the defined space, then that location within the defined space representation is considered the presumptive resource location within an actual building. An example of this can be seen in FIG. 5, which shows a sensor placed at a specific location 515 on the first floor of a building representation. In some implementations, the resources have wiring requirements associated with them, and when a resource is selected, then the wiring requirements for the resource are also selected. In some implementations, a user can input wiring requirements for a given resource.

Figure 7:
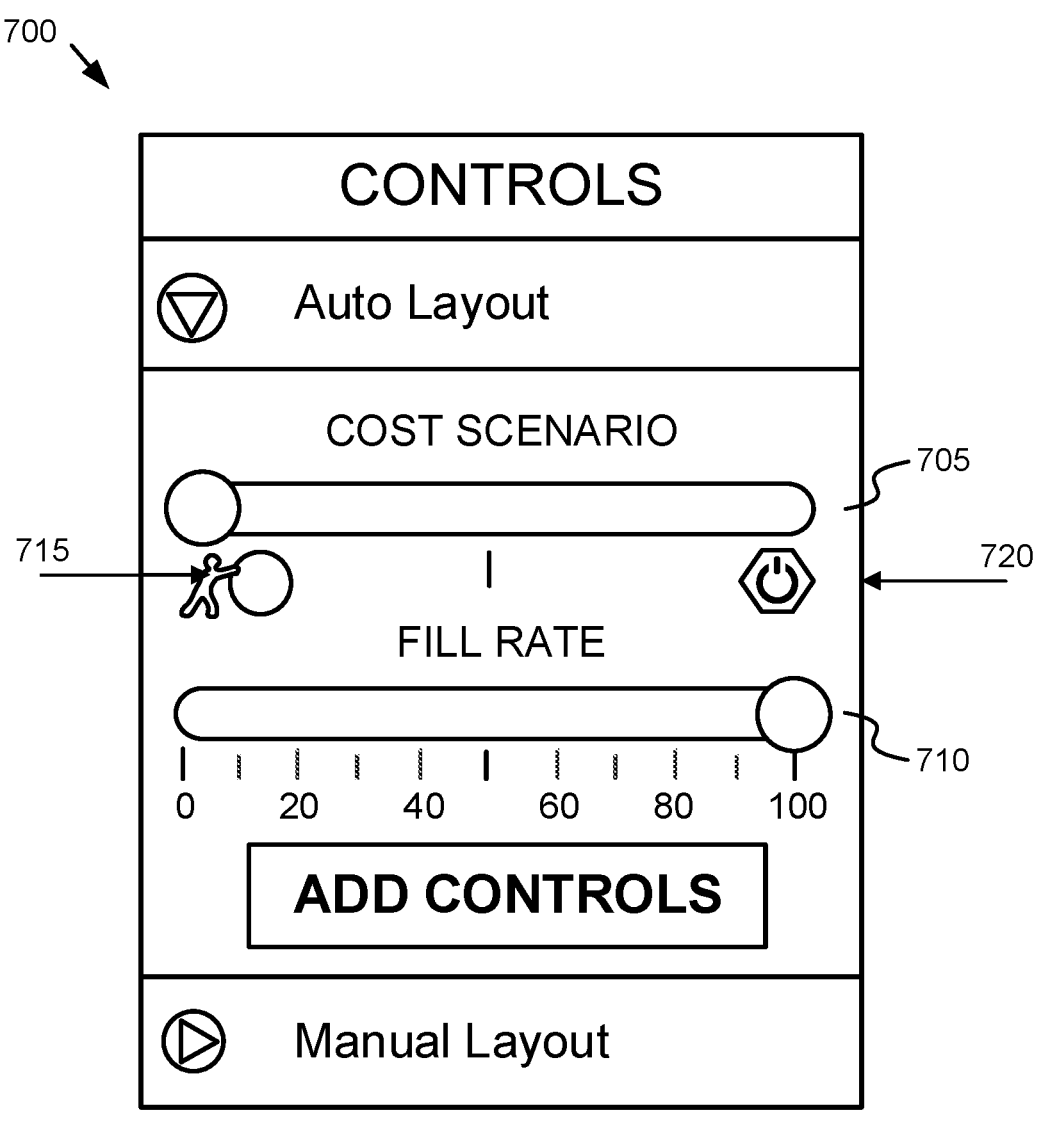
FIG. 7 is an exemplary diagram showing potential wiring constraints that can be used in some embodiments.

FIG. 7 is an exemplary diagram showing potential wiring constraints that can be used in some embodiments. With continuing reference to FIG. 3, at operation 315, a constraint is accepted. Common constraints are equipment cost vs. labor cost, and controller fill rate vs. controller cost, and so on. In some embodiments, a constraint can be input by a user on a user interface, as shown at 700. In some embodiments, constraints are accepted a different way. Controllers can be wired to some number of unit models (e.g., equipment, resources, sensors, etc.). One of the possible constraints is a cost scenario which allows a user to choose between higher labor costs and higher equipment cost. In an exemplary embodiment, a cost scenario slider shown at 705 goes from high labor costs (indicated by the icon of a human rolling a large ball 715) to high equipment costs (indicated by the icon of a power switch 720). A user can accept a constraint by setting the slider to a value between high labor cost and high equipment cost. When higher labor cost is chosen, the number of controllers is minimized, as fewer controllers will be used, but the resources will be further from their controller. This increases the average length from the controller any given piece of equipment is, requiring more labor to install.

In some embodiments, another possible constraint is "fill rate". Fill rate indicates how full each of the controllers should be, which may be listed in percentages, (0, 20, 40, . . . 100) as shown at 710, though other methods are envisioned, as well. A high fill rate saves money on controllers, but most likely raises installation costs, as, on average, the controllers will be further from the resources they will be wired to. When a low controller fill rate is chosen, such as 40%, it also provides more room for future unit models to be added to the controller, thus minimizing new controller installation costs.

At operation 320, placement of the controller(s) within the defined space representation is calculated, based partly on the constraint (which may be stored in memory 115). When many controllers are incorporated, the constraint may made a significant difference in placement. At 325, a wiring route is determined between the controller and the unit model 405 based, at least in part, upon the unit model wiring requirements 410. A controller 105 itself, using its processor(s) may create the wiring requirements. In some implementations, multiple controllers working together may create the wiring requirements. In some implementations, the wiring requirements are created using a computer or computers associated with a controller. In some implementations, the wiring requirements are created using a separate computer system. In some implementations the controller 105 understands what the defined space looks like from, e.g., the defined space representation; understands where needed controllers go within the defined space, and understands what the locations 415 of the unit models 405 are. As such, the wiring route can be determined by the controller(s) or other computer implementations using techniques known to those of skill in the art. At operation 330, a point mapping is determined. The point mapping is between the controller (that the unit model will be attached to) and the unit model 405 based in part on the wiring requirements 410, while the actual wiring documentation from controller to unit model is determined by where the controller is placed in relation to the unit model 405.

Figure 8:
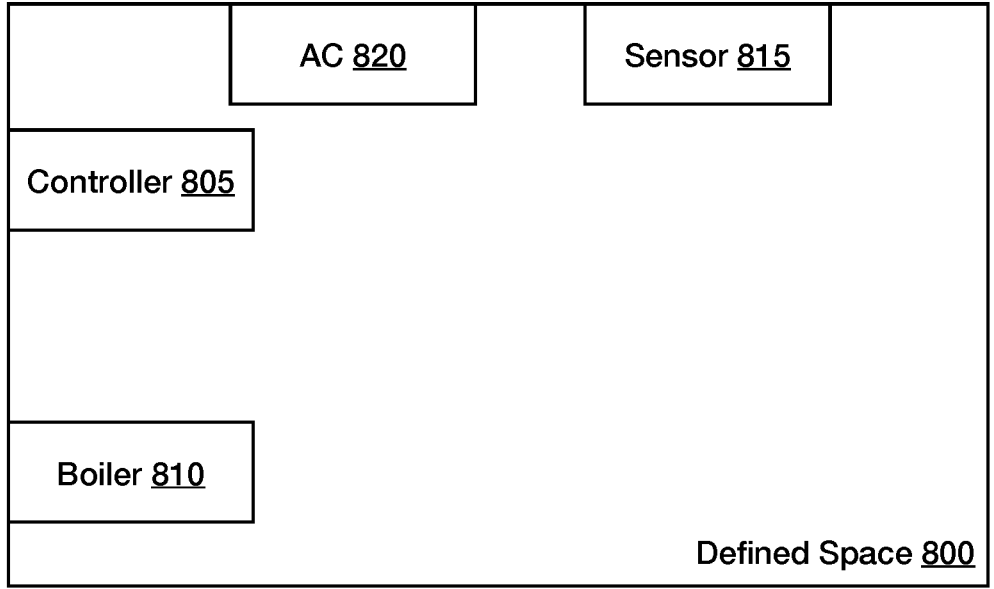
FIG. 8 is a diagram showing relationship between a controller and unit models that can be used in some embodiments.

In an exemplary embodiment, FIG. 8 shows a simple defined space 800 with a controller 805, and three unit models: a boiler 810, an air conditioner 820, and a sensor 815. Placement of the controller 805 is determined based on a number of factors, including the distance between the controller 805, and the unit models. The unit models should have wiring requirements 410 associated with them, either automatically through selection of an associated icon, or through a user entering the information by hand into a user interface, such as those shown in FIGS. 2 and 3.

Figure 9:
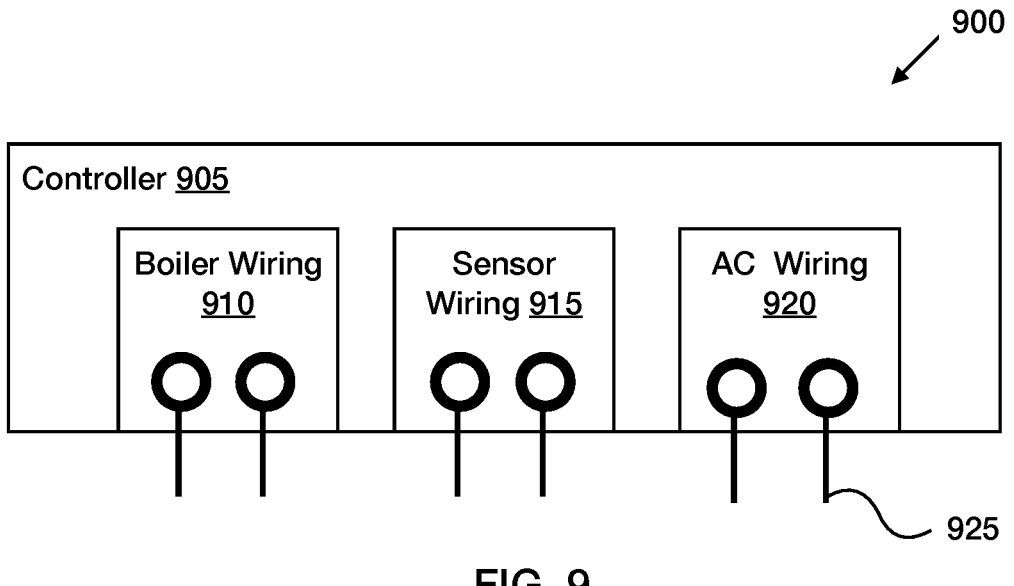
FIG. 9 is is a diagram of an exemplary controller-unit model wiring relationship in conjunction with which described embodiments can be implemented.

FIG. 9 discloses an embodiment of controller wiring 900. In some descriptive examples, these wiring requirements will be associated with terminals in the controller. The controller will know the number of wiring terminals required by each unit model and the correct type of information for the wiring terminal, e.g., though the methods and systems discussed with reference to FIGS. 5 and 6. The controller, in the example given, will understand the boiler wiring 910 requirements, the location of the boiler 810, the sensor wiring 915 requirements, the locations of the sensor 815, the AC wiring 920 requirements, and the location of the sensor 815. A specific wiring location is shown at 925 where, in this case, a specific air conditioning wire expected to be wired directly into the controller 905.

FIG. 10 at 1000 discloses a first level wiring diagram. Once a defined space representation (e.g., 800) has been set up on the controller and at least one constrain has been determined (e.g., 900), a network wiring diagram can be generated. At its simplest, the wiring diagram describes the number of controllers needed for the defined space, in this example, two, controller 1005 and controller 1010. How the controllers are connected is also shown, here, a single connection 1015 between the two. In some embodiments, clicking on, or otherwise selecting a controller will bring up a point mapping diagram, shown in more detail at FIG. 13. Wiring requirements of the unit models that will be connected to the controller are used to determine how many unit models may be connected to each controller, so how many controllers in total need to be used. The constraints are also used to determine where the controllers will be placed, and how much space is available in each controller. Which unit model is moved into each controller may be determined by location of unit model in relation to controller, etc.

Figure 11:
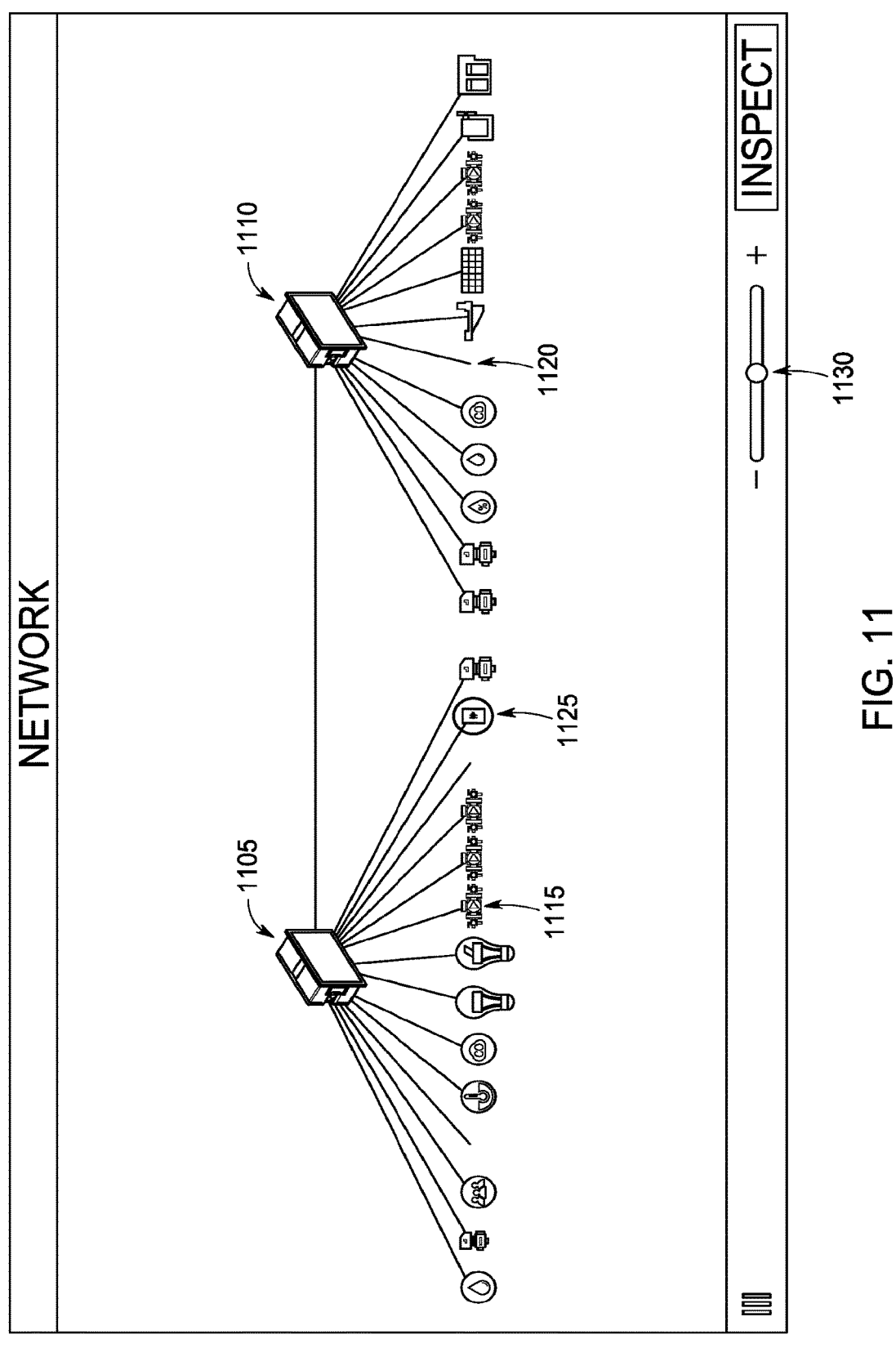
FIG. 11 is an exemplary network controller device wiring diagram in conjunction with which described embodiments can be implemented.

FIG. 11 discloses a network wiring diagram 1100 that shows the controllers 1105, 1110, and also shows the devices 1115 that are (or will be) attached to the controller 1105. Icons 1125 describe what sort of unit model is attached to the controller. In an illustrative example, the user interface is configured to allow a user to input a request to move a unit model, e.g., 1115 from being connected to a terminal wiring location, e.g. on the first controller 1105 to a terminal wiring location, e.g., 1120 on a second controller, e.g, 1110.

Figure 12:
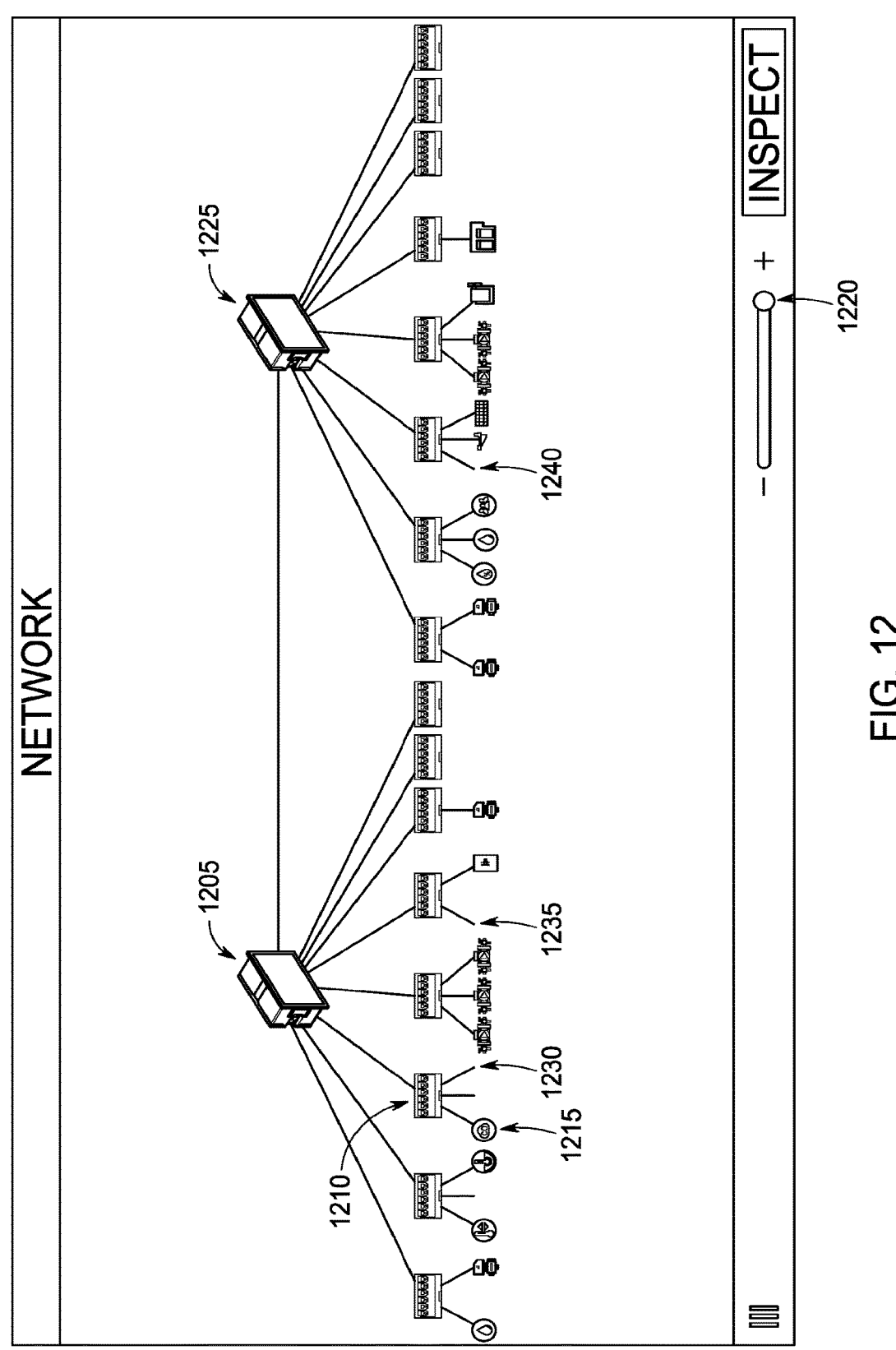
FIG. 12 is an exemplary network controller module device wiring diagram in conjunction with which described embodiments can be implemented.

FIG. 12 discloses an exemplary network wiring diagram 1200 that shows controllers 1205, modules in the controller 1210, modules in the controller 1210, and unit models 1215 attached to the modules that are attached to the controllers. In some embodiments, unit models can be moved from a location on a module, e.g. 1215, to a location on a same module 1230, a different module 1235, and/or a location on a different controller 1240.

After moving a unit model, a user request can rebuild the wiring route and the point mapping with the new controller-unit model configuration. This may be useful when constructing a building, and when for some reason, a unit model (e.g., a resource) will not fit at its intended location, and must be moved. Moving the unit model using a user interface, such as the one shown at FIGS. 10-13, will allow the wiring diagrams and point maps to be regenerated very rapidly by a controller 105 or a system of controllers that includes controller 105 such that construction can continue unimpeded.

In some embodiments, each of the three views, eg., those shown in FIGS. 10-13, can be selected by a user. In the displayed embodiment, a thumb 1020 on a slider bar 1025 in the far left position shows the controller only network wiring diagram. The thumb in the middle position 1130 shows the controller-unit model network wiring diagram, and the thumb in the far-right position 1220 shows the controller-module-unit model network wiring diagram. Other methods of display are also envisioned in this disclosure. Controller point maps may also be displayed. In some embodiments, clicking on a controller, e.g., 1005, 1105, 1205, brings up the point map for the given controller.

Figure 13:
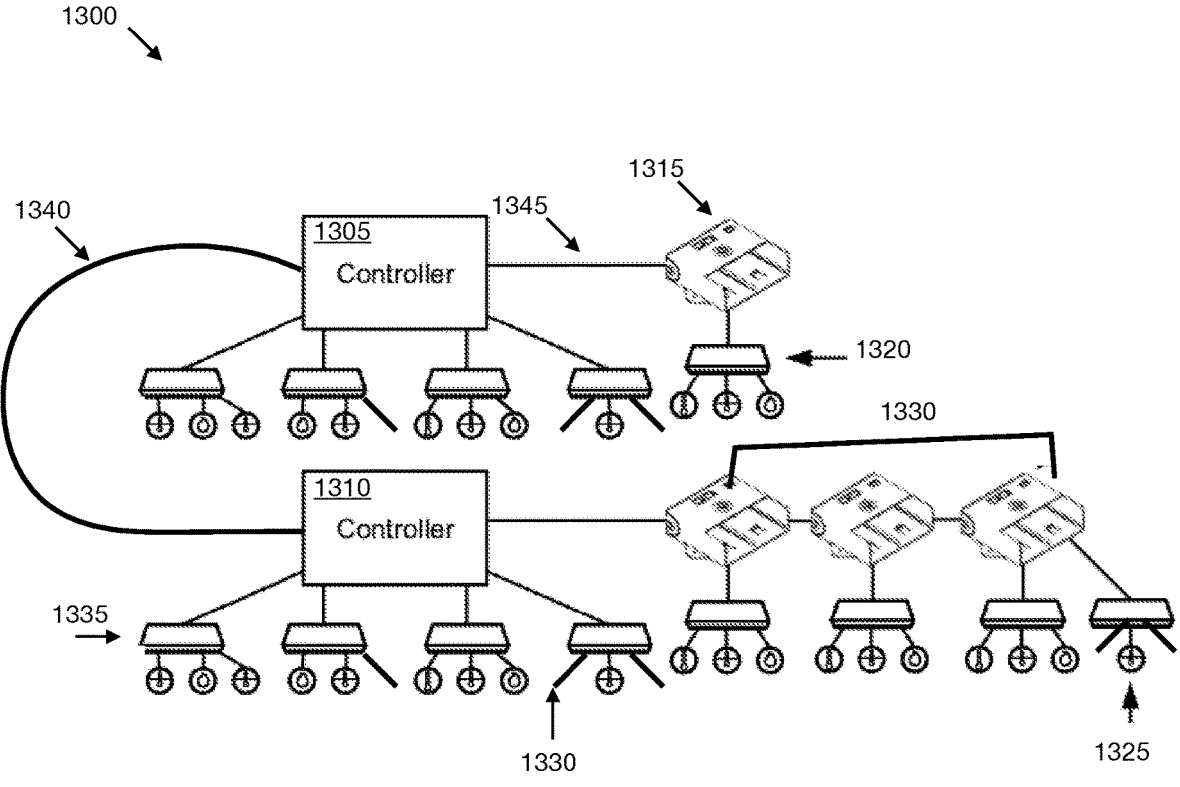
FIG. 13 is an exemplary network wiring diagram with multiple controller types in conjunction with which described embodiments can be implemented.

FIG. 13 discloses network wiring diagram 1300 with multiple types of controllers. A system may comprise two types of controllers: controller leaders 1305, 1310 and satellite controllers 1315, 1330. Control leaders have more hardware and memory than satellite controllers, and, in some systems, send messages to the satellite controllers informing them what messages to give to modules. In some systems, the satellite controller may process the messages to give the unit models. In some systems, the controller leader and the satellite controller may share the tasks. Controllers and satellite controllers may both use modules 1330, 1335 to attach to unit models 1325. Terminal connectors in modules may directly (or indirectly) wire to resources 225 represented by unit modules 1325. A controller may determine an action for a unit model (such as turn on an air conditioner) then either pass that information onto a module associated with the controller itself, or in some embodiments, directly tells a unit model. In some embodiments, the modules 1320, 1335 comprise hardware and software that allows them to make decisions when given information from controllers (e.g., controller leaders and satellite controllers.)

In some embodiments, controller leaders 1305, 1310 are connected 1340, 1345 to other controller leaders and satellite controllers 1315 through wired or wireless methods. These controller leaders may make up a distributed system that shared processing tasks needed to determine tasks, such as generating wiring diagrams and generating pin mapping.

In some embodiments, the controllers are comprised of modules which plug into the controllers. The modules 1030, 1035 may be listed on a display screen 1300. Unit models, e.g., 1325 may be moved to empty locations 1330. After moving a unit model, a user request may rebuild the wiring route and the point mapping with the new controller-unit model configuration. This may be useful when constructing a building, and when for some reason, a unit model (e.g., a resource) will not fit at its intended location, and must be moved.

Figure 14:
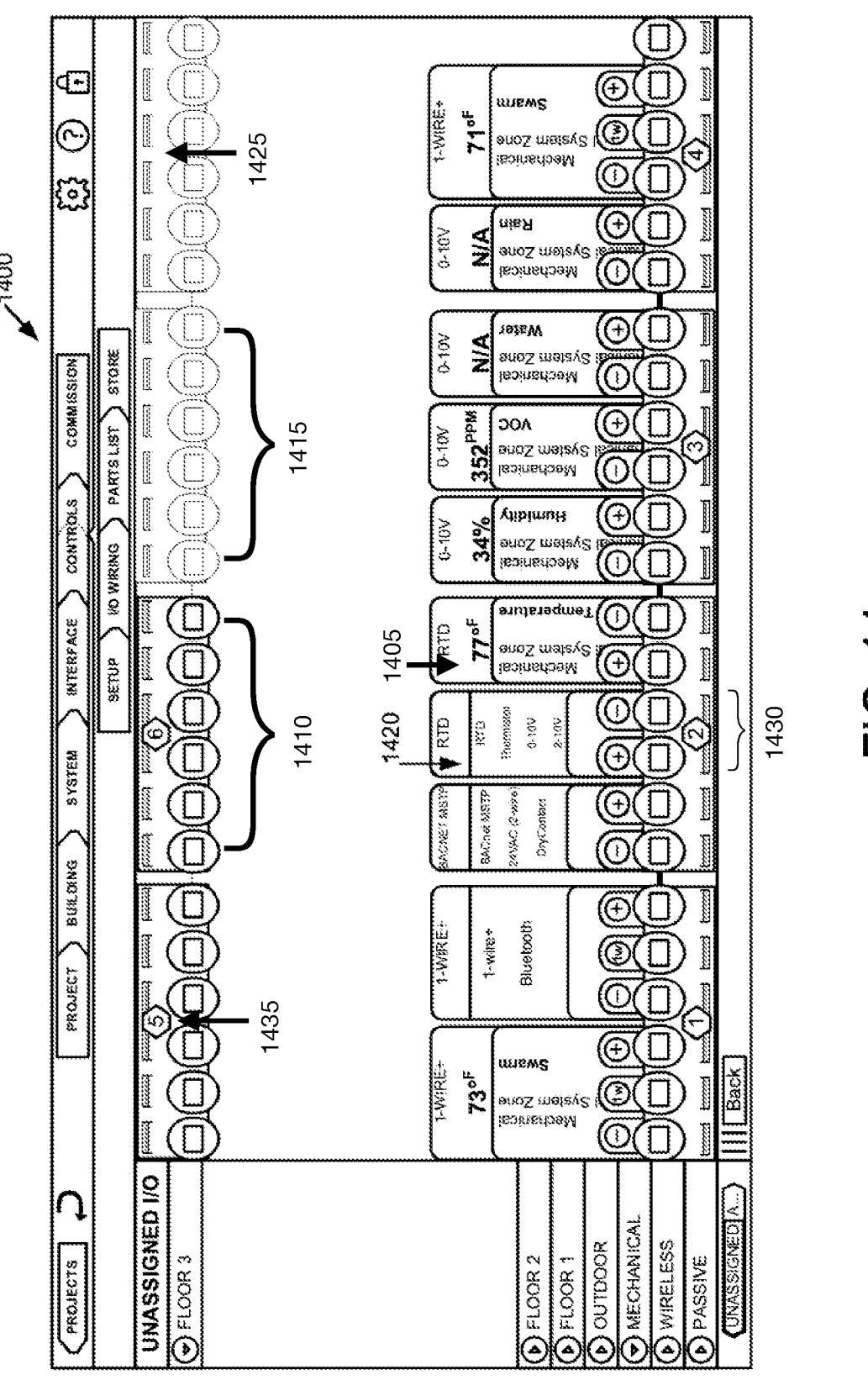
FIG. 14 is an exemplary point map in conjunction with which described embodiments can be implemented.

FIG. 14 discloses a pin mapping screen shot 1400 that can be used to view or modify pin mappings in some embodiments. Once a network diagram has been created, users can change the protocol type of a unit model, can change the pin locations within a unit model, can move unit models to other locations within the controller, etc. For example, a temperature sensor may have been originally spec'd to have an RTD protocol/interface 1405. However, such a temperature sensor may be unavailable, but a temperature sensor with a different protocol, such as "Thermistor" may be available 1420. Selecting RTD 1405 will display a menu or other option that may show the available protocols 1420. Selecting a protocol, such as "Thermistor" will change the protocol expected on this object model, and also change the controller so that it expects the new protocol on the associated wiring terminal(s) 1430. Often, a different protocol will have a different pin wiring format, or because of specific space requirements, etc., or it may be better for a specific installation to change locations of resources (which changes the pin wiring) deep into a construction job. Selecting a unit module 1420 may allow a user to choose another protocol; in this specific example, for this sensor, a user can choose between RTD, Thermisor, 1-10V, and 2-10V. Controller 1400 has six modules 1410, each marked by a number 1435. Two module slots are empty 1415, as shown by no module number 1425 showing. Other modules markings are envisioned by this disclosure.

Figure 15:
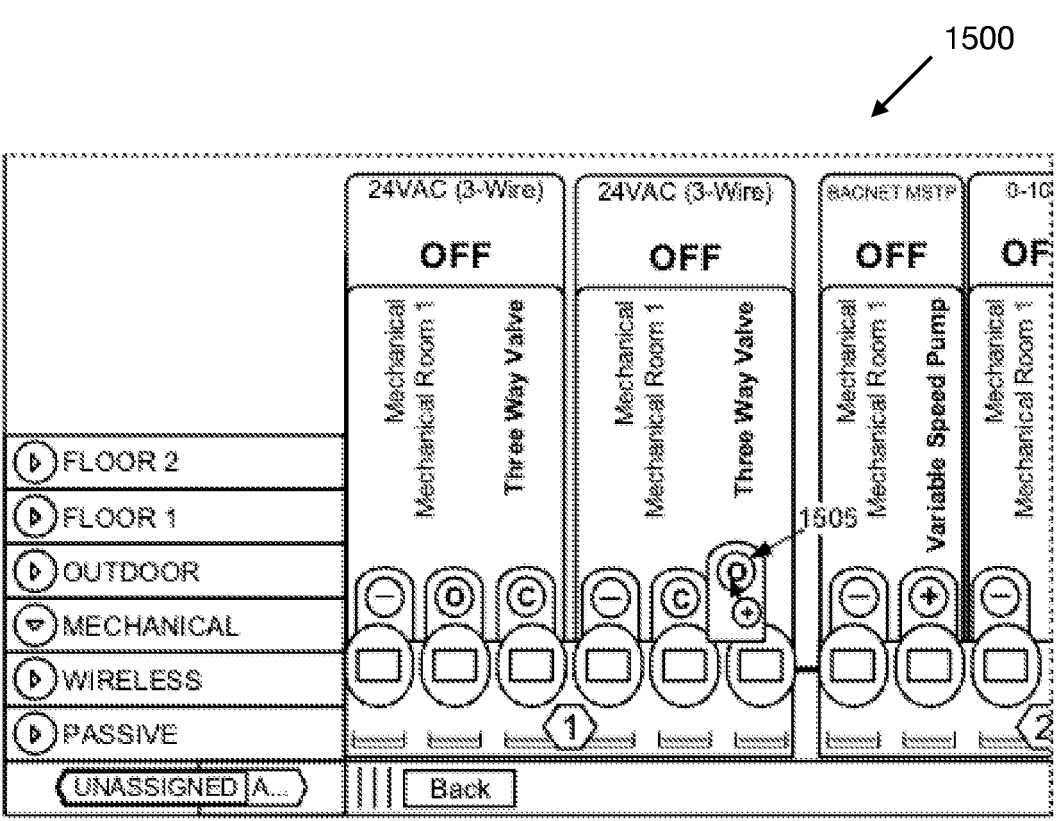
FIG. 15 is an exemplary screen shot in conjunction with which described embodiments can be implemented.

FIG. 15 discloses a user interface 1500 that allows moving wiring terminals within a unit model. Auser may be able to move pins on a user model by using a user interface representation of the controller. The user can choose a pin representation 1505 and then change it to the desired location. For example, the (O) and the (C) can be swapped. This informs the controller that the pin type is to be the type specified by the user.

In some embodiments, the controller comprises a wiring module with terminal wiring requirements. A user can modify the terminal wiring requirement of the wiring module by selecting a wiring terminal. This may bring up a list of predefined terminal types. The user may then select one of the predefined types.

In some embodiments, when a terminal type is to be changed by, e.g., modifying a screen representation of controller, module, and, or terminal, the terminal is physically changed at the controller or the module or both, depending on implementation. This terminal type can be changed, as, in some embodiments, the terminals are set up with hardware controlled by software that allows them to be switched to various types, by the type being specified by a user, such as, e.g., on a user interface screen such as shown in FIGS. 14 and 15.

The terminal type may be changed at the module level, with hardware and/or software in the module to allow the pin type to be changed. In some embodiments, the modified wiring requirement will be checked to determine that there is a match between the modified wiring requirement and the wiring requirements of the unit model that is connected to the terminal. In some embodiments, the user can change the unit model that is connected to one or more terminals. The modified wiring requirement may be checked to determine if there is a match between the new unit model and the types of terminals that are currently in those locations. If there is not a match, the user may be notified; in some embodiments, the controller may change physical terminal associated with the controller, using a combination of software and hardware. In some embodiments, the resource connector 220 in the module 215 is changed at request of the controller, using the resource interface 205. In some embodiments, the module comprises the hardware that changes the resource connector by receiving a message from a controller.

Figure 16:
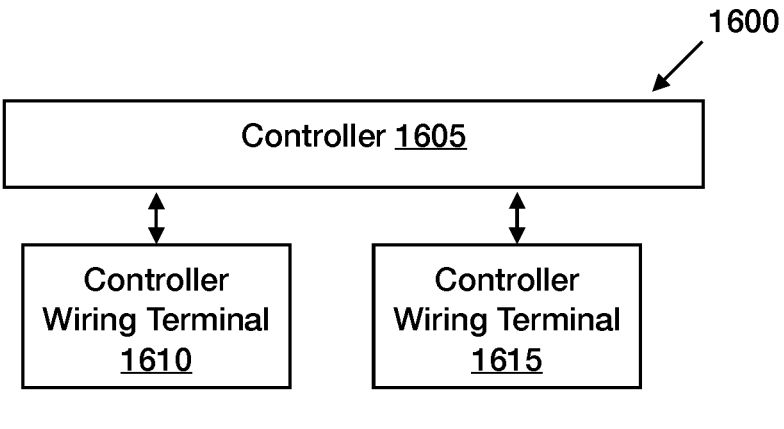
FIG. 16 is is a block diagram of an exemplary controller portion in conjunction with which described embodiments can be implemented.
Figure 17:
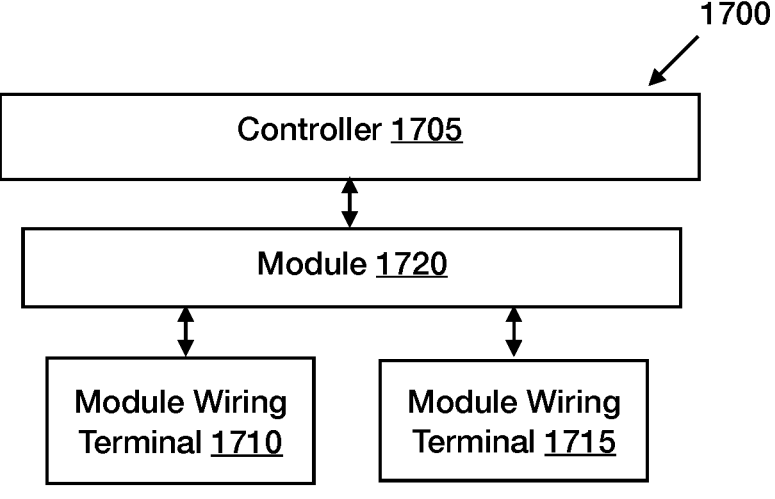
FIG. 17 is is a block diagram of an exemplary controller-module relationship in conjunction with which described embodiments can be implemented.

With reference to FIG. 16, when a terminal type is changed by a user (e.g., using a user interface 120), in some embodiments, the controller 1605 has access to the wiring requirements 410 of the unit model 405, and wiring requirements 1610, 1615 of the controller(s) itself. With reference to FIG. 17, in some embodiments, unit models are, e.g., attached to modules 1720 through their module wiring terminals 1710, 1715. The controller (or controllers) has access to information about the unit models through, e.g., user interfaces such as those shown in, e.g., FIGS. 10-15. Through this knowledge, the controller(s) 1705 can determine whether a unit model currently can be attached to a wiring terminal on a module 1710, 1715 or a controller(s) 1610, 1615. The controller(s) may also be able to determine where a unit model could be attached within a controller(s) system, e.g., as shown in FIG. 14, whether the controller(s) wiring terminal pins could to be changed to match the pin requirements of a unit model, etc. The controller may also be able to modify its controller wiring terminal 1610, 1615 based on requirements of the wiring of the unit model(s). When a controller uses modules 1720, the module may be able to change the requirements of its wiring terminal 1710, 1715 based on requirements of the unit models attached to those portions of the module.

Figure 18:
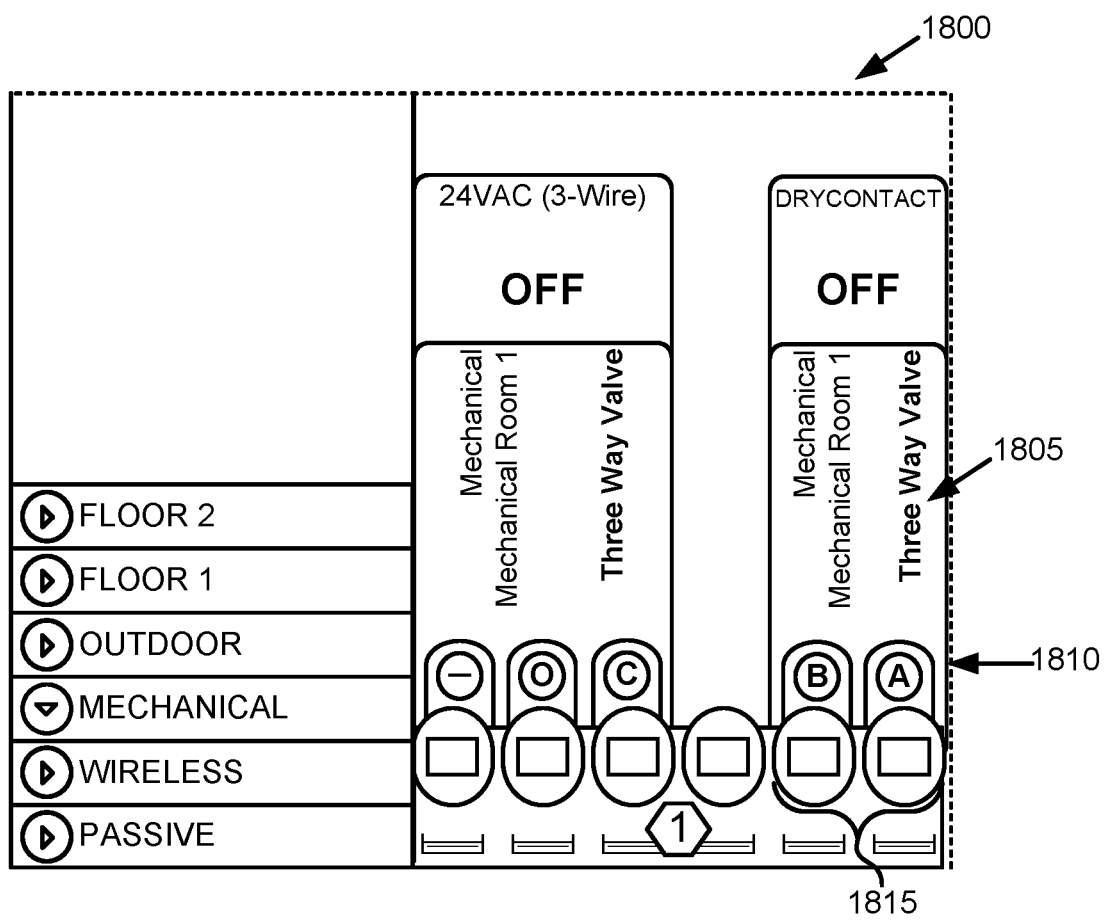
FIG. 18 is an exemplary portion of a screen shot with which described embodiments can be implemented.
Figure 19:
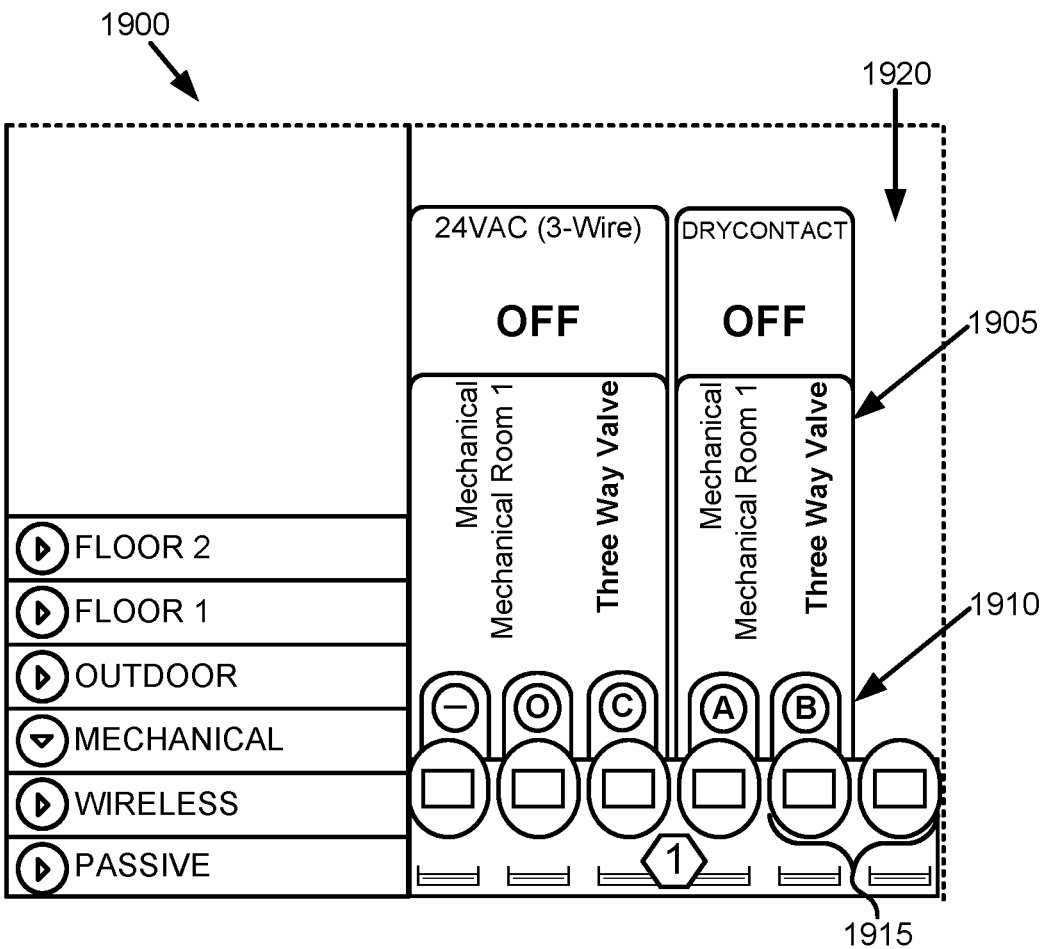
FIG. 19 is an exemplary portion of a screen shot with which described embodiments can be implemented.

FIGS. 18 and 19 illustrate moving unit models from one location on a controller to another. FIGS. 18 at 1800 represent a portion of a controller user interface screen, such as e.g., that shown at FIG. 14. A three way valve unit model 1805 is in the two far right-terminal connectors 1815 of a module 1800. The terminal to the far right is of type A, and the one to the left of it is of type B 1810. There is a controller wiring terminal pin between the two Three Way Valves that is empty. As shown at 1900, using a touch-screen, a mouse, or a different user input method, a user may move the three way valve 1905 one terminal connector to the left 1915, leaving an unconnected terminal connector 1920 at the far right of the module The user is also able to switch the types of terminal connectors on the three-way value from "B-A" to "A-B" 1910. The choices listed here are just examples and are not intended to be exhaustive.

III. Computing Environment

Figure 20:
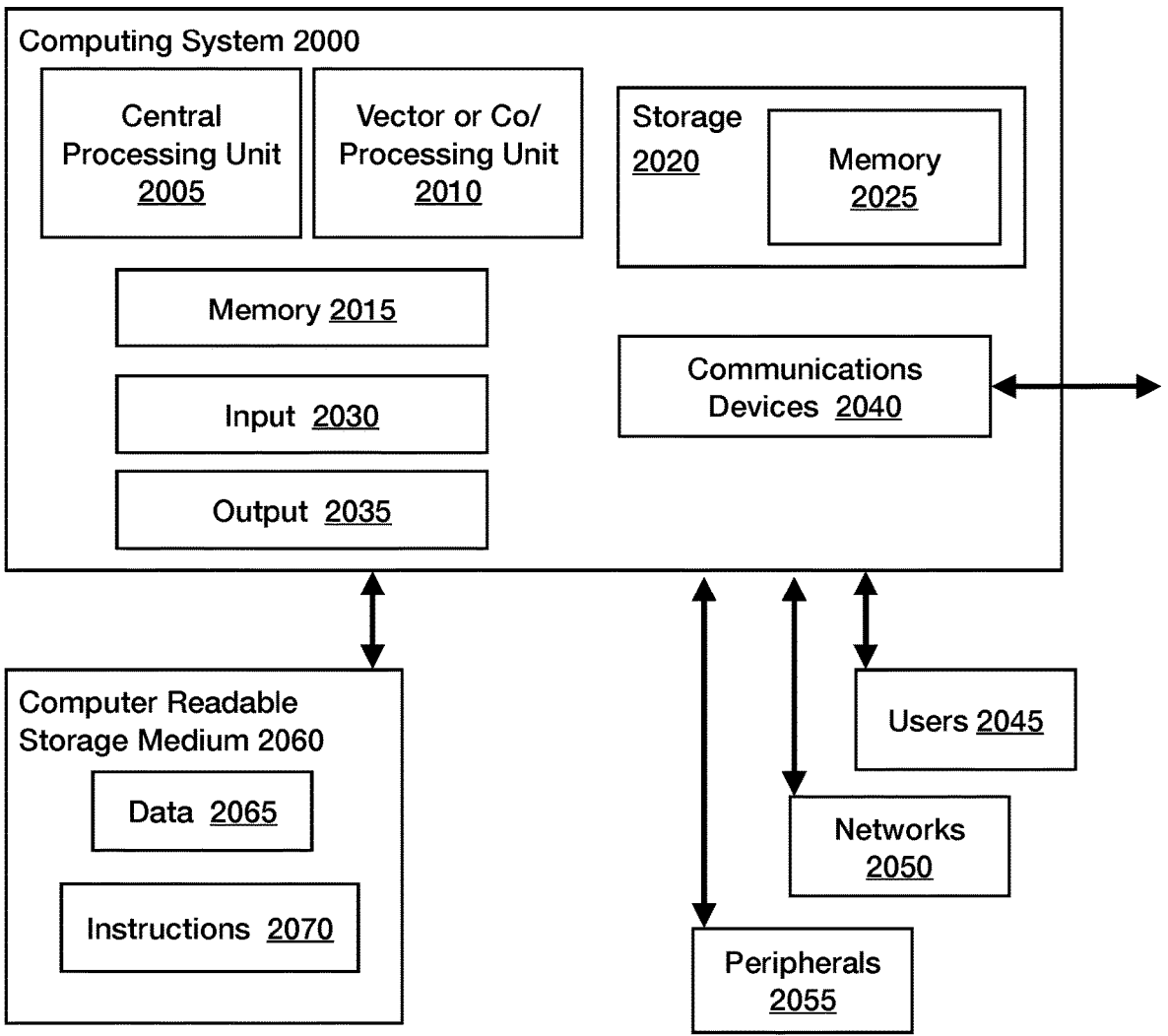
FIG. 20 is a block diagram illustrating an automated point mapping system having at least one processor and at least one memory which interact with one another under the control of software, and also illustrating some configured storage medium examples.

With reference to FIG. 20, an exemplary computing environment, which may be a controller, a series of connected controllers, a series of connected controllers in conjunction with a computer, a controller in conjunction with a computer, or some combination of the above, includes at least one central processing unit 2005 and memory 2015, 2025. The processing unit executes computer-executable instructions and may be a real or a virtual processor. There might also be a vector or co/processing unit 2010 that enables fast vector processing. In a multi-processing system, multiple processing units execute computer-executable instructions to increase processing power. The memory 2015, 2025 may be volatile memory (e.g., registers, cache, RAM), non-volatile memory (e.g., ROM, EEPROM, flash memory, etc.), or some combination of the two. For example, the memory can be volatile memory, e.g., static memory cells, as in FPGAs and some CPLDs; or non-volatile memory, e.g., FLASH memory, as in some CPLDs. or in any other appropriate type of memory cell. The memory stores software implementing described techniques and tools. The computer system may be distributed, with multiple processors and associated memory in different locations that communicate using wired or wireless network connections. These distributed computing nodes may run simultaneously run the same program using distributed computing techniques.

A computing environment, including controllers, satellite controllers, and modules, may have additional features. For example, the computing environment may include storage 2020 which may also include memory 2025, one or more input devices 2030, one or more output devices 2035, and one or more communication connections (all grouped under communication devices 2040). An interconnection mechanism such as a bus, controller, or network interconnects the components of the computing environment. Typically, operating system software stored in memory 2015, 2025 provides an operating environment for other software executing in the computing environment, and coordinates activities of the components of the computing environment. The computing system may also comprise one or more networks 2050: wired, wireless, or some combination, other peripherals 2055, such as printers, etc., and users 2045. The computer system 2000, like other suitable systems, may also include one or more computer-readable non-transient storage media 2060. Media 2060 may be of different physical types. The media 2060 may be volatile memory, non-volatile memory, fixed in place media, removable media, magnetic media, optical media, solid-state media, and/or of other types of physical durable storage media (as opposed to merely a propagated signal). In particular, a configured medium 2060 such as a portable (i.e., external) hard drive, CD, DVD, memory stick, or other removable non-volatile, non-transient memory medium may become functionally a technological part of the computer system when inserted or otherwise installed, making its content accessible for interaction with and use by central processing unit 2005. The removable configured medium 2060 is an example of a computer-readable storage medium 2060. Some other examples of computer-readable storage media 2060 include built-in RAM, ROM, hard disks, and other memory storage devices which are not readily removable by users 2045. A computer-readable medium should not be considered a signal; neither should a computer-readable memory be considered a signal.

The medium 2060 is configured with instructions 2070 that are executable by a central processing unit 2005; "executable" is used broadly to include, interpretable code, software interpreter code (e.g., bytecode and/or p-code), machine code and/or code that runs using a distributed system, for example. The medium 2060 is also configured with data 2065 which is created, modified, referenced, and/or otherwise used for technical effect by execution of the instructions 2070. The instructions 2070 and the data 2065 configure the memory or other storage medium 2060 in which they reside; when that memory or other computer readable storage medium is a functional part of a given computer system, the computer system may be configured by the instructions 2070 and data 2065.

Although an embodiment may be described as being implemented as software instructions executed by one or more processors in a computing device (e.g., general pur-
pose computer, cell phone, or controller), such description is
not meant to exhaust all possible embodiments. One of skill
will understand that the same or similar functionality can
also often be implemented, in whole or in part, directly in
hardware logic, to provide the same or similar technical
effects. Alternatively, or in addition to software implemen-
tation, the technical functionality described herein can be
performed, at least in part, by one or more hardware logic
components. For example, and without excluding other
implementations, an embodiment may include hardware
logic components such as Field-Programmable Gate Arrays
(FPGAs), Application-Specific Integrated Circuits (ASICs),
Application-Specific Standard Products (ASSPs), System-
on-a-Chip components (SOCs), Complex Programmable
Logic Devices (CPLDs), and similar components. Compo-
nents of an embodiment may be grouped into interacting
functional modules based on their inputs, outputs, and/or
their technical effects, for example.

In view of the many possible embodiments to which the
principles of the disclosed invention may be applied, it
should be recognized that the illustrated embodiments are
only examples of the invention and should not be taken as
limiting the scope of the invention. Rather, the scope of the
invention is defined by the following claims. We therefore
claim as our invention all that comes within the scope and
spirit of these claims.

The invention claimed is:

1. A computer-implemented method comprising:
   accepting a defined space representation into a controller,
      the controller comprising a processor and a memory;
   accepting a list of unit models into the controller, unit
      models within the list of unit models having wiring
      requirements and location within the defined space
      representation;
   generating, using the processor, the memory, and the
      defined space representation, a computed location of
      the controller within the defined space representation;
   generating a wiring route between the controller and the
      unit models within the list of unit models based at least
      in part on the defined space representation;
   allowing a user to modify a terminal wiring requirement
      of a wiring module of the controller, producing a
      modified wiring requirement, and
   wherein the controller is configured to check the modified
      wiring requirement to determine match between the
      modified wiring requirement and a wiring requirement
      of a resource to be connected to a terminal associated
      with the wiring module.

2. The computer-implemented method of claim 1,
wherein generating a wiring route between the controller
and the unit models is further based in part on a desired
percentage of the controller to be filled with devices.

3. The computer-implemented method of claim 1,
wherein generating a wiring route between the controller
and the unit models is further based in part on a desired cost
versus labor calculation.

4. The computer-implemented method of claim 1, further
comprising using the processor and memory to generate a
number of controllers needed based at least partially on a
constraint.

5. The computer-implemented method of claim 4,
wherein the constraint comprises minimizing labor, mini-
mizing hardware, maximizing labor, maximizing hardware,
or specifying fill rate of hardware.

6. The computer-implemented method of claim 1, further
comprising:

displaying the controller on a user interface;
   receiving an interaction from the user interface indicating
      that the controller has been selected;
   generating a point mapping between the controller and the
      unit models within the list of unit models based in part
      on the wiring route; and
   displaying the point mapping between the controller and
      the unit models within the list of unit models.

7. The computer-implemented method of claim 6,
wherein a unit model within the list of unit models has
wiring requirements, the wiring requirements are displayed
on the user interface, and wherein wiring of a terminal
associated with the controller is modified when a modified
wiring requirement is received from a user via the user
interface.

8. The computer-implemented method of claim 6, further
comprising modifying the terminal associated with the wir-
ing module to match at least a portion of requirements of the
point mapping.

9. A system comprising: a controller with a processor, and
a memory in operable communication with the processor;
including instructions residing in the memory, which are
executable by the processor to perform a method which
includes:
   accepting a defined space representation into the control-
      ler, the controller comprising a processor, and a
      memory;
   accepting a list of unit models into the controller, unit
      models within the list of unit models having wiring
      requirements and location within the defined space
      representation;
   generating, using the processor, the memory, and the
      defined space representation, a computed location of
      the controller;
   generating, using the processor, a wiring route between
      the controller and the unit models within the list of unit
      models based at least in part on the defined space
      representation;
   allowing a user to modify a terminal wiring requirement
      of a wiring module of the controller, producing a
      modified wiring requirement;
   checking the modified wiring requirement to determine
      match between the modified wiring requirement and a
      wiring requirement of a resource to be connected to a
      terminal associated with the wiring module; and
   wherein the controller is configured to check the modified
      wiring requirement to determine match between the
      modified wiring requirement and a wiring requirement
      of the resource to be connected to the terminal.

10. The system of claim 9, further comprising a program
residing in memory that modifies a controller terminal on the
controller based on a user instruction.

11. The system of claim 9, wherein the controller further
comprises a wiring module with a terminal wiring require-
ment, the controller allowing a user instruction to modify the
terminal wiring requirement of the wiring module, produc-
ing a modified wiring requirement.

12. The system of claim 9, further comprising, based on
a user request, modifying a protocol of a wiring terminal
associated with the controller.

13. The system of claim 9, further comprising a second
controller and wherein a user interface is configured to allow
a user to input a request to move one of the unit models to
the second controller, and wherein the controller or the
second controller rebuilds the wiring route.

14. The system of claim 9, further comprising:

generating a point mapping between the controller and the unit models within the list of unit models based in part on the wiring route.

15. The system of claim 14, further comprising modifying the terminal associated with the wiring module to match at least a portion of requirements of the point mapping.

16. A non-transient storage medium configured with code which upon execution by a controller having one or more processors coupled with memory-stored instructions performs a controller placement method, the method comprising:

instructions for accepting a defined space representation into a controller based on a user instruction, the controller comprising a processor, and a memory;

instructions for accepting a list of unit models into the controller, unit models within the list of unit models having wiring requirements and location within the defined space representation;

instructions for generating a computed location of the controller using the processor, the memory, and the defined space representation;

instructions for generating a wiring route between the controller and the unit models within the list of unit models based at least in part on the defined space representation;

instructions for allowing a user to modify a terminal wiring requirement of a wiring module of the controller, producing a modified wiring requirement;

instructions for the controller to check modified wiring requirement to determine match between the modified wiring requirement and a wiring requirement of a resource to be connected to a terminal associated with the wiring module; and wherein the controller is configured to check the modified wiring requirement to determine match between the modified wiring requirement and a wiring requirement of the resource to be connected to the terminal.

17. The non-transient storage medium of claim 16, further comprising:

instructions for generating a point mapping between the controller and the unit models within the list of unit models based in part on the wiring route, and instructions for displaying the point mapping on a user interface.

18. The non-transient storage medium of claim 17, further comprising instructions for modifying the terminal associated with the wiring module to match at least a portion of requirements of the point mapping.

19. The non-transient storage medium of claim 18, wherein modifying the terminal associated with the wiring module comprises modifying pins on the wiring module.

20. The non-transient storage medium of claim 18, wherein generating a wiring route between the controller and the unit models is further based in part on a desired percentage of the controller to be filled with devices.

* * * * *